United States Patent
Kinoshita et al.

(10) Patent No.: US 8,489,710 B2
(45) Date of Patent: Jul. 16, 2013

(54) NETWORK SYSTEM, CONTROLLER, RECORDING DEVICE, SERVICE SERVER, METHOD OF ACQUIRING RESOURCE STATUS OF RECORDING DEVICE, AND COMPUTER PROGRAM

(75) Inventors: Akihiko Kinoshita, Tokyo (JP); Takashi Kanao, Tokyo (JP); Hiroyuki Chiba, Kanagawa (JP); Tsuyoshi Homma, Chiba (JP); Hirofumi Kouda, Saitama (JP)

(73) Assignee: Sony Corporation, Tokyo (JP)

( * ) Notice: Subject to any disclaimer, the term of this patent is extended or adjusted under 35 U.S.C. 154(b) by 751 days.

(21) Appl. No.: 12/024,771

(22) Filed: Feb. 1, 2008

(65) Prior Publication Data
US 2008/0256218 A1 Oct. 16, 2008

(30) Foreign Application Priority Data
Feb. 20, 2007 (JP) ................................. 2007-039208

(51) Int. Cl.
*G06F 15/177* (2006.01)
(52) U.S. Cl.
USPC ........... 709/220; 709/219; 709/223; 709/224; 370/252; 370/254
(58) Field of Classification Search
USPC .................. 709/220, 219, 223, 224; 370/252, 370/254
See application file for complete search history.

(56) References Cited

U.S. PATENT DOCUMENTS

| 6,766,426 | B1 | 7/2004 | Sugiyama |  |
|---|---|---|---|---|
| 2005/0192975 | A1* | 9/2005 | Reiner et al. | 707/100 |
| 2006/0093325 | A1* | 5/2006 | Imai et al. | 386/83 |
| 2006/0140576 | A1* | 6/2006 | Oka | 386/46 |
| 2006/0265489 | A1* | 11/2006 | Moore | 709/223 |
| 2008/0298268 | A1* | 12/2008 | Chiba et al. | 370/252 |
| 2009/0106801 | A1* | 4/2009 | Horii | 725/91 |
| 2009/0109959 | A1* | 4/2009 | Elliott et al. | 370/352 |
| 2009/0210912 | A1* | 8/2009 | Cholas et al. | 725/82 |
| 2010/0017506 | A1* | 1/2010 | Fadell | 709/224 |

FOREIGN PATENT DOCUMENTS

| JP | 2006-155860 | 6/2006 |
|---|---|---|
| JP | 2006-184995 | 7/2006 |
| JP | 2006-268938 | 10/2006 |

* cited by examiner

*Primary Examiner* — Thu Ha Nguyen
(74) *Attorney, Agent, or Firm* — Oblon, Spivak, McClelland, Maier & Neustadt, L.L.P.

(57) ABSTRACT

A network system including: a terminal unit; one or more recording devices; a service server; and a controller is disclosed. The controller includes: a resource status acquiring unit that, upon receiving a resource status acquisition request to request acquisition of information on resource status of the one or more recording devices, the resource status acquisition request being transmitted from the service server that received the remote recording reservation request from the terminal unit, transmits a resource status acquisition instruction to the one or more recording devices via the local area network and receives a result of determination on remote recording reservation depending on the resource status, as the resource status information, from the one or more recording devices.

19 Claims, 17 Drawing Sheets

NETWORK SYSTEM, CONTROLLER, RECORDING DEVICE, SERVICE SERVER, METHOD OF ACQUIRING RESOURCE STATUS OF RECORDING DEVICE, AND COMPUTER PROGRAM

CROSS REFERENCES TO RELATED APPLICATIONS

The present invention contains subject matter related to Japanese Patent Application JP 2007-039208 filed in the Japanese Patent Office on Feb. 20, 2007, the entire contents of which being incorporated herein by reference.

BACKGROUND OF THE INVENTION

1. Field of the Invention

The present invention relates to a network system which is capable of allowing a terminal unit to control a recording device via a network, a direct access management server, a recording device, a service server, a method of acquiring resource status of the recording device, and a computer program.

2. Description of Related Art

In recent years, services have spread which provide an EPG (Electronic Program Guide) for broadcasting programs of terrestrial analog television broadcasting, terrestrial digital television broadcasting, CS digital broadcasting, BS digital broadcasting, and the like, or so-called "Net program" which is contents provided from program delivery service site on Internet.

In addition, as services associated with EPG, remote recording reservation services have been known which reserve recording of contents, such as broadcasting programs selected of an EPG displayed on a display of a terminal unit, onto a recording device connected to a network. Upon receiving a request for remote recording reservation from the terminal unit via the network, a server for the remote recording reservation service transmits recording reservation information, including, for example, channel name, broadcasting date, broadcasting start/end time, title name, etc. of a program to be recorded, to the recording device or the like associated with the terminal unit. The recording device records broadcasting programs based on the recording reservation information received from the server (for example, see JP-A-2001-309285).

SUMMARY OF THE INVENTION

If there exists a plurality of recording devices which are capable of accepting remote recording reservation from a terminal unit via a network, a user of the terminal device has to select one of the recording devices at a remote recording reservation site and transmit a request for remote recording reservation. At this time, in order to guarantee reliable recording, the selected recording device has to have sufficient empty capacity in a recording medium for recording, and a tuner of the recording device has not to be used to receive contents that have been already reserved to be recorded, at a broadcasting time for contents to be now remotely reserved to be recorded. However, since empty capacity of the recording medium of the recording device, content of registered recording reservation, etc. are not definitely known, it is difficult for the user of the terminal unit to select a proper recording device as a remote recording reservation site.

Under the above circumstances, it is desirable to provide a network system which is capable of making a remote recording reservation for a recording device most appropriate as a remote recording reservation site from a standpoint of resource status of the recording device via a network, a controller, a recording device, a service server, a method of acquiring resource status of a recording device, and a computer program.

According to an embodiment of the present invention, there is provided a network system including a terminal unit, one or more recording devices, a service server that provides the terminal unit with a service to make remote recording reservation for the recording device via a network, and a controller that receives a remote recording reservation request from the service server via the network and selectively makes remote recording reservation for the one or more recording devices via a local area network, wherein the terminal unit includes a remote recording reservation requesting unit that transmits the remote recording reservation request for the one or more recording devices to the service server, the service server includes a remote recording reservation processing unit that transmits a resource status acquisition request to request acquisition of information on resource status of the one or more recording devices to the controller upon receiving the remote recording reservation request from the terminal unit, the controller includes a resource status acquiring unit that transmits a resource status acquisition instruction to the one or more recording devices via the local area network according to the resource status acquisition request from the service server and receives the information on resource status from the one or more recording devices, and each of the one or more recording devices includes a resource status providing unit that makes determination on remote recording reservation depending on resource status of the recording device according to the resource status acquisition instruction from the controller and transmits a result of the determination, as the resource status information, to the controller via the local area network.

In the network system according to the embodiment of the invention, as the service server transmits a resource status acquisition request to request acquisition of information on resource status of the one or more recording devices to the controller upon receiving the remote recording reservation request from the terminal unit, and the controller collects the information on the remote recording reservation, as the resource status information, depending on the resource status of the one or more recording devices connected via the local area network according to the resource status acquisition request from the service server, it is possible to make the determination on the recording device most appropriate for a remote recording reservation site based on the resource status information of the recording device and make remote recording reservation for the determined most appropriate recording device via the network.

According to another embodiment of the present invention, there is provided a controller that is connected to one or more recording devices via a local area network, is accessible to a network along with a terminal unit and a service server which provides the terminal unit with a service to make remote recording reservation for the recording device via a network, receives a remote recording reservation request from the service server, and selectively makes remote recording reservation for the one or more recording devices via the local area network, including: a resource status acquiring unit that, upon receiving a resource status acquisition request to request acquisition of information on resource status of the one or more recording devices, the resource status acquisition request being transmitted from the service server that received the remote recording reservation request from the terminal unit, transmits a resource status acquisition instruction to the one or more recording devices via the local area network and receives a result of determination on remote recording reservation depending on the resource status, as the resource status information, from the one or more recording devices.

According to the embodiment of the present invention, as the controller collects the information on the remote recording reservation, as the resource status information, depending on the resource status of the one or more recording devices connected via the local area network according to the resource status acquisition request from the service server, it is possible to make the determination on the recording device most appropriate for a remote recording reservation site based on the resource status information of the recording device and make remote recording reservation for the determined most appropriate recording device via the network.

In the controller according to another embodiment, the resource status acquiring unit may transmit the resource status information, which is received from the one or more recording devices, to the service server. With this configuration, it is possible to make the determination on the recording device most appropriate for a remote recording reservation site based on the resource status information of the recording device and make remote recording reservation for the determined most appropriate recording device via the network.

The controller according to another embodiment may further include a resource status analyzing unit that analyzes the resource status information of the one or more recording devices, which is acquired by the resource status acquiring unit, to determine the recording device most appropriate for a remote recording reservation site. With this configuration, the controller can determine the recording device most appropriate for the remote recording reservation site.

The controller according to another embodiment may further include a remote recording reservation processing unit that transmits a remote recording reservation instruction to the recording device, which is determined by the resource status analyzing unit, via the local area network. With this configuration, the controller can make remote recording reservation for the determined most appropriate recording device.

According to still another embodiment of the present invention, there is provided a recording device including a resource status providing unit that may be connected to the controller according to one embodiment of the invention via a local area network, makes determination on remote recording reservation depending on resource status of the recording device based on a resource status acquisition instruction transmitted from the controller via the local area network, and transmits a result of the determination, as resource status information, to the controller via the local area network.

In the recording device according to the embodiment of the invention, the resource status acquisition instruction may include information specifying contents, which are an object of recording reservation, and recording mode information, and the resource status providing unit may calculate capacity required for recording of the contents based on the information specifying the contents, which are the object of recording reservation, and the recording mode information, make the determination on remote recording reservation based on the required capacity and empty capacity of a recording medium for contents recording, and transmit a result of the determination, as the resource status information, to the controller via the local area network. With this configuration, a recording device with a recording medium having insufficient empty capacity can be excluded from selection of remote recording reservation site, thereby allowing selection of a recording device appropriate for the remote recording reservation site.

In the recording device according to still another embodiment of the invention, the resource status providing unit may make determination on an empty situation of a tuner, which is a resource for broadcasting reception, based on information specifying contents, which are an object of recording reservation, and a recording reservation list in which information on registered recording reservation is registered, and transmit a result of the determination, as the resource status information, to the controller via the local area network. With this configuration, a recording device useless for remote recording reservation as a tuner for broadcasting reception is used for reception of contents for which recording reservation has been already completed can be excluded from selection of remote recording reservation site, thereby allowing selection of a recording device appropriate for the remote recording reservation site.

In the recording device according to the embodiment of the invention, the resource status providing unit may make determination on whether recording reservation of contents, which is an object of recording reservation, has been already registered, based on information specifying the contents, which are the object of recording reservation, and a recording reservation list in which information on registered recording reservation is registered, and, if the recording reservation of contents was registered, transmit the resource status information, which is added with the fact that the recording reservation of contents was registered, to the controller via the local area network. With this configuration, overlapped recording reservation of the same contents can be avoided.

According to yet still another embodiment of the present invention, there is provided a service server that may be connected to a network along with a terminal unit and the controller according to one embodiment of the invention, and provides the terminal unit with a service to make remote recording reservation for a recording device via the network, including a remote recording reservation processing unit that, upon receiving a remote recording reservation request for one or more recording devices from the terminal unit, transmits a resource status acquisition request to request acquisition of information on resource status of the one or more recording devices to the controller, and receives a result of determination on remote recording reservation depending on the resource status, as the resource status information, in the one or more recording devices from the controller.

With this configuration, the service server can acquire the resource status information of the recording device, which is acquired by the controller.

In the service server according to yet still another embodiment of the present invention, the remote recording reservation request transmitted from the terminal unit may include operation mode information, and the remote recording reservation processing unit may make determination on whether the resource status information of the one or more recording devices, which is received from the controller, is transmitted to the terminal unit, based on the operation mode information. With this configuration, a user of the terminal unit can freely determine whether selection of a recording device at a remote recording reservation site based on the resource status information of one or more recording devices is made by the service server or the terminal unit.

The service server according to the embodiment of the present invention may further include a resource status analyzing unit that analyzes the resource status information to determine the recording device most appropriate for a remote recording reservation site when the remote recording reservation processing unit determines that the resource status information of the one or more recording devices is not transmitted to the terminal unit of a remote recording reservation source. With this configuration, the service server can automatically select a recording device at a remote recording reservation site.

According to the above embodiments of the invention, from the standpoint of resource status of recording devices, it is possible to make remote recording reservation for the recording device most appropriate for a remote recording reservation site over the network.

DESCRIPTION OF PREFERRED EMBODIMENTS

Hereinafter exemplary embodiments of the invention will be described with reference to the accompanying drawings.

Figure 1:
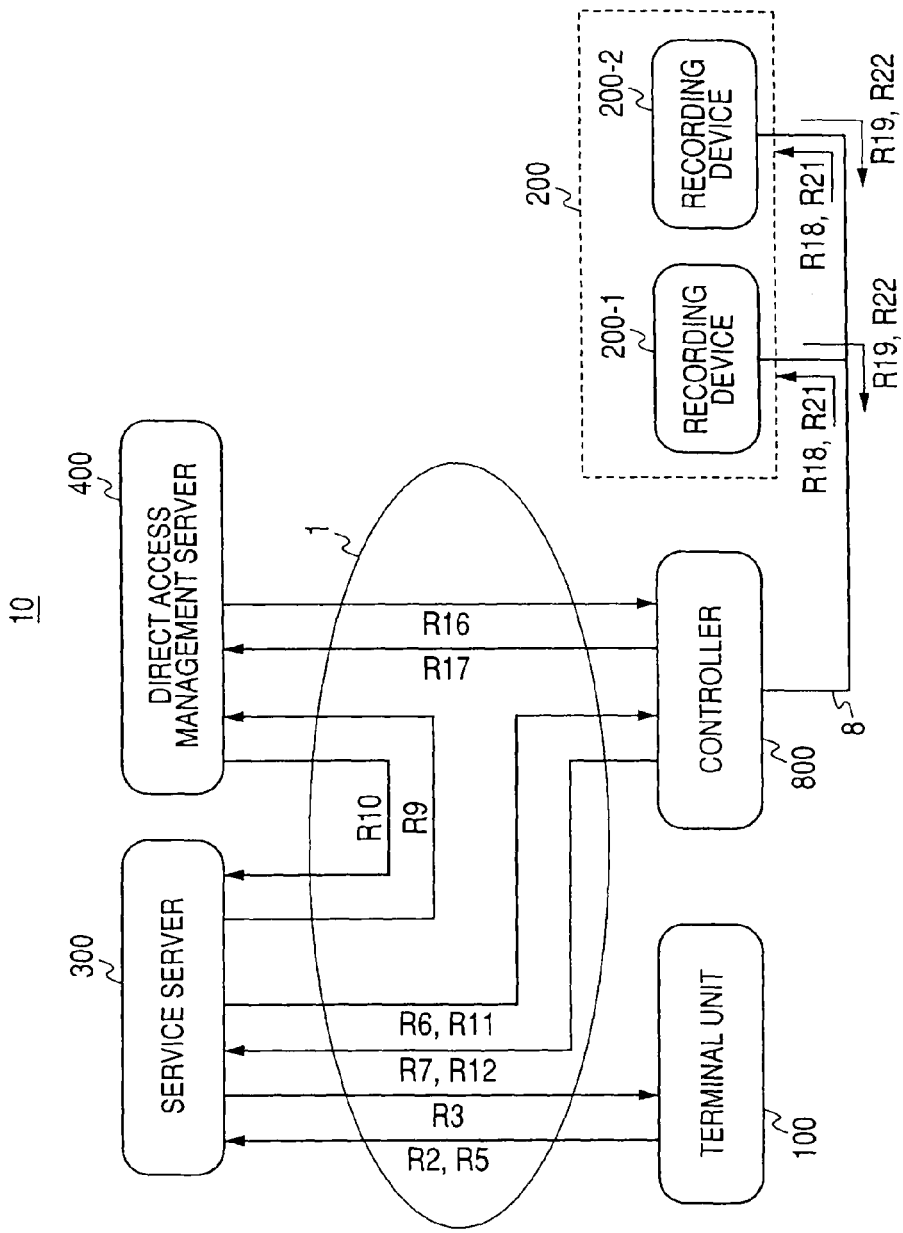
FIG. 1 is a view showing the overall configuration of a network system according to a first embodiment of the invention.

FIG. 1 is a view showing the overall configuration of a network system 10 according to a first embodiment of the invention.

The network system 10 includes a terminal unit 100, a service server 300, a direct access management server 400 and a controller 800, all of which are interconnected for communication via a network 1 such as Internet. One or more recording devices 200 (200-1 and 200-2) may be connected to the controller 800 via LAN (Local Area Network) 8.

In denotation of the recording device 200, reference numerals 200-1 and 200-2 denote individual recording devices. If not particularly needed, the individual recording devices are generally denoted by "recording device 200" or "recording device 200 (200-1 and 200-2)".

The terminal unit 100 is a unit which is capable of controlling the recording device 200 through the network 1 using various services provided by the service server 300.

The recording device 200 is a device which may be controlled by the terminal unit 100 through the network 1. For example, the recording device 200 is a recording device or the like which records various kinds of contents, including programs (including moving pictures and sound), music, still images, program, data, etc. delivered by IP multi-cast broadcasting or VoD (Video on Demand) system from a content delivery server (not shown) via the network 1, and broadcasting programs from various broadcasting stations such as terrestrial analog television broadcasting, terrestrial digital television broadcasting, CS digital broadcasting, BS digital broadcasting, and the like. The recording device 200 is a device which is capable of processing requests for remote recording reservation and so on, which are transmitted from the terminal unit 100, using services provided by the service server 300.

The service server 300 is a server used to provide the terminal unit 100 with various kinds of services such as remote recording reservation to make access to the recording device 200 over the network 1.

The direct access management server 400 manages combination of the terminal device 100 and the services provided by the service server 300 and association of the terminal device 100 with the controller 800 and performs a process related to transfer of information such as URI for direct access required to make direct access to the controller 800 over the network 1 based on the association. In addition, the direct access management server 400 performs a process to establish a normal access session over the network 1 between the direct access management server 400 and the controller 800.

The controller 800 is a device which is managed, as one of devices to be controlled, by the direct access management server 400. The controller 800 is a device which collects, as information on resource status, information on remote recording reservation according to resource status of the recording device 200 connected to the controller 800 over the LAN 8, depending on a resource status acquisition request R6 from the service server 300, prepares a list D10 of collected resource status information of the recording device 200, transmits the prepared list D10 to the service server 300, and transmits, via the LAN 8, a remote recording reservation instruction R21 to the recording device 200 connected to the controller 800 over the LAN 8, depending on a remote recording reservation request 11 from the service server 300.

Although not shown in FIG. 1, a contents guide delivery server may be also included in the network 1 in addition to the content delivery server. The contents guide delivery server stores contents guide data including information required for recording reservation for each of contents in addition to broadcasting schedule, summary and so on related to various contents such as programs, music, still images, program, data and so on delivered from the content delivery server via the network and contents such as programs and so on broadcasted from broadcasting stations, and delivers the contents guide data to the terminal unit 100 over the network 1 upon receiving a contents guide acquisition request from the terminal device 100 and so on connected to the network 1.

Figure 2:
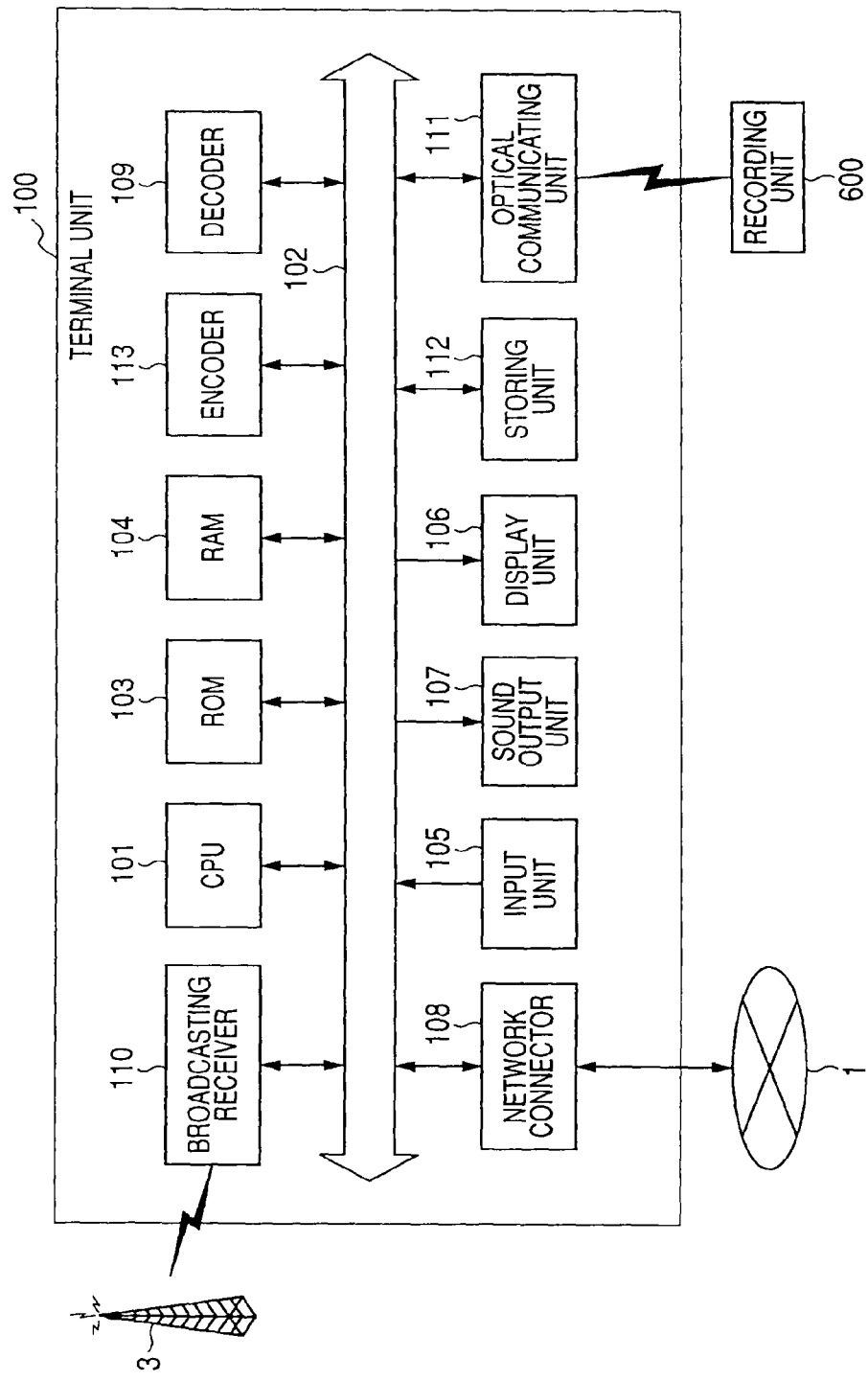
FIG. 2 is a block diagram showing a hardware configuration of a terminal unit in FIG. 1.

Next, the terminal unit 100 will be described. FIG. 2 is a block diagram showing a hardware configuration of the terminal unit 100. As shown in the figure, a CPU (Central Processing Unit) 101 is connected with a ROM (Read Only Memory) 103, a RAM (Random Access Memory) 104, an input unit 105, a display unit 106, a sound output unit 107, a network connecter 108, a decoder 109, a broadcasting receiver 110, an optical communicating unit 111, a storing unit 112, and an encoder 113 via a system bus 102.

The input unit 105 has various keys and so on and processes input of various instructions and data from a user. The instructions inputted from the user through the input unit 105 are provided to the CPU 101 by an input interface (not shown) via the system bus 102.

The display unit 106 includes a display device such as an LCD or the like and a display control circuit to drive the display device. The sound output unit 107 includes a circuit to convert a digital sound signal to an analog sound signal, a speaker, etc.

The network connecter 108 processes access to the network 1 by wire or wireless. The broadcasting receiver 110 receives broadcasting waves delivered from a broadcasting station 3 such as terrestrial analog television broadcasting, terrestrial digital television broadcasting, CS digital broadcasting, BS digital broadcasting, portable device-purposed terrestrial digital television broadcasting and the like and demodulates video signals and audio signals.

The decoder 109 decodes encoded data of a program read from the storing unit 112 and restores digital video data and digital audio data. The restored digital video data are provided to and displayed on the display unit 106 via the system bus 102, while the restored digital audio data are provided to the sound output unit 107 via the system bus 102 and are outputted as sound from the speaker.

The optical communicating unit 111 is an interface to process communication with an external device such as the recording device 200 or the like, and specifically conducts communication with the external device through wireless medium such as infrared ray, radio wave, sound wave, electromagnetic wave or the like. The communication with the recording device 200 may be conducted via the network 1 instead of the optical communication.

The encoder 113 encodes a video signal and an audio signal of a broadcasting program outputted from the broadcasting receiver 110 using, for example, an MPEG2 (Moving Picture Experts Group 2) system or the like.

The storing unit 112 stores content guide data acquired from the contents guide delivery server via the network 1, a recording reservation list prepared by the terminal unit 100, etc. In addition, the storing unit 112 may store broadcasting program data and so on, which are received in the broadcasting receiver 110 and then encoded in the encoder 113.

The ROM 103 is a read only memory to permanently store programs and data for process of software to be executed by the terminal unit 100. The programs may be stored in the storing unit 112. The RAM 104 is a writable volatile memory used to load a program code executed by the CPU 101 or write work data of programs. The CPU 101 controls the above components as a whole and controls data exchange among these components. Also, the CPU 101 loads programs from the storing unit 112 or the ROM 103 into the RAM 104, and analyzes and executes the programs in order to perform a software process to be executed by the terminal unit 100.

Next, a software configuration of the terminal unit 100 will be described with reference to FIG. 3.

As shown in the figure, the terminal unit 100 includes a contents guide acquiring unit 121, a contents guide storing unit 122, a contents guide display processing unit 123, a remote recording reservation requesting unit 124, a resource status display processing unit 125, and a recording reservation notifying unit 126. The contents guide storing unit 122 is set as the storing unit 112 or the RAM 104.

The contents guide acquiring unit 121 acquires contents guide data D1 from a contents guide delivery server 500 via the network 1 and stores it in the contents guide storing unit 122.

The contents guide display processing unit 123 reads in the contents guide data D1 stored in the contents guide storing unit 122, prepares display data D2 of contents guide, and displays the display data D2 on the display unit 106.

When the remote recording reservation requesting unit 124 is inputted with a remote reservation instruction R1 from a user by means of the input unit 105 in a contents guide screen displayed on the display unit 106, the remote recording reservation requesting unit 124 extracts recording reservation program information D3, which is required for remote recording reservation of contents as an object of remote recording reservation, from the contents guide data stored in the contents guide storing unit 122, and transmits a remote recording reservation request R2 including the recording reservation program information D3, recording mode information, operation mode information, and a control-targeted device ID for the service server of the controller 800 to the service server 300. In addition, the remote recording reservation requesting unit 124 outputs a resource status list D10, which is included in a remote recording reservation result notification R3 received from the service server 300 in response to the transmitted remote recording reservation request R2, to the resource status display processing unit 125.

The resource status display processing unit 125 prepares display data D5 of the resource status list D10 of the recording device, which is inputted from the remote recording reservation requesting unit 124, and outputs it to the display unit 106.

The recording mode information is information specifying recording quality such as high quality/standard/low quality. The operation mode information is information specifying a method of determining the recording device 200 at a remote recording reservation site based on the resource status information of the recording device 200. The operating mode information includes "User selection" in which the terminal unit 100 acquires the resource status information from the service server 300 and presents it to a user, and the user may select the recording device 200 at a remote recording reservation site, "Automatic selection" in which the service server 300 automatically selects the recording device 200 at a remote recording reservation site based on the resource status information. The recording mode information and the operation mode information may be randomly selected by the user by means of the input unit 105.

As the user selects a recording device 200 to be a remote recording reservation site from the recording devices 200, which are displayed, along with resource status, on the display unit 106, and inputs an instruction to select a recording reservation site by means of the input unit 105, a recording reservation site selection instruction R20 including information on the selected recording device 200 at the remote recording reservation site is given to the recording reservation notifying unit 126. Upon receiving the recording reservation site selection instruction R20, the recording reservation notifying unit 126 extracts the information on the selected recording device 200 at the remote recording reservation site from the recording reservation site selection instruction R20 and transmits a recording reservation site selection request R5 including the extracted information on the selected recording device 200 at the remote recording reservation site to the service server 300 via the network 1.

In this embodiment, the terminal unit 100 may be of any suitable type including a portable telephone, a portable terminal such as a PDA (Personal Digital Assistant), a personal computer, etc. without being limited thereto.

Next, the service server 300 will be described.

Figure 4:
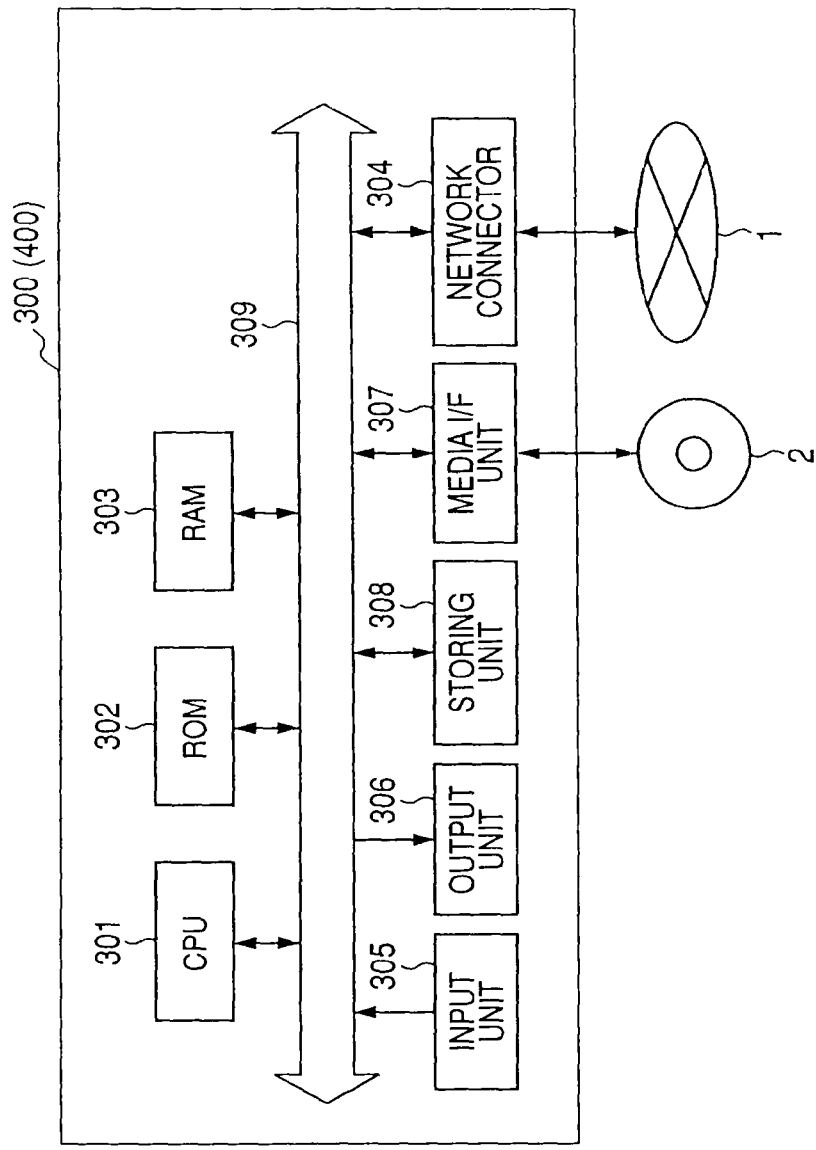
FIG. 4 is a block diagram showing a hardware configuration of a service server and a direct access management server in FIG. 1.

The service server 300 may be configured as a typical computer system such as a personal computer, as shown in FIG. 4.

Specifically, a CPU 301 is connected with a ROM 302, a RAM 303, a network connector 304, an input unit 305 including a keyboard and a mouse and so on, a display including a CRT (Cathode Ray Tube), an LCD (Liquid Crystal Display) or the like, an output unit 306 including a speaker or the like, a media interface 307, and a storing unit 308 including a hard disk drive, a nonvolatile memory and the like.

The network connector 304 is a unit for performing a communication process via the network 1. The storing unit 308 stores programs and various data for software process. The CPU 301 loads programs from the storing unit 308 into the RAM 303, and analyzes and executes the programs in order to perform a software process. The media interface 307 is properly loaded in a removable media 2 such as a magnetic disc, an optical disc, a magneto-optical disc, a semiconductor memory or the like, and programs read from the removable media 2 are installed in the storing unit 308 if necessary.

Next, a software configuration of the service server 300 will be described with reference to FIG. 5. The service server 300 includes an operation mode information retaining unit 321, a remote recording reservation processing unit 322 and a resource status analyzing unit 323. The operation mode information maintaining unit 321 is set as the storing unit 308 or the RAM 303.

Upon receiving the remote recording reservation request R2 including the recording reservation program information D3, the recording mode information, the operation mode information, and the control-targeted device ID for the service server of the controller 800 from the terminal unit 100, the remote recording reservation processing unit 322 extracts the control-targeted device ID for the service server of the controller 800 from the remote recording reservation request R2, transmits a direct access start request R9 including the extracted control-targeted device ID for the service server of the controller 800 to the direct access management server 400 via the network 1, and maintains the operation mode information, which is extracted from the remote recording reservation request R2, in the operation mode information maintaining unit 321.

In addition, upon receiving a direct access start response R10 from the direct access management server 400 in response to the transmitted direct access start request R9, the remote recording reservation processing unit 322 accesses the controller 800 based on URI for direct access of the controller 800, which is included in the direct access start response R10, and transmits a resource status acquisition request R6 including the recording reservation program information D3 and the recording mode information to the controller 800.

In addition, upon receiving a resource status acquisition response R7 from the controller 800 via the network 1, the remote recording reservation processing unit 322 extracts the resource status list D10 of the recording device 200 from the resource status acquisition response R7, reads the operation mode information from the operation mode information maintaining unit 321, and sends the resource status list D10 to the resource status analyzing unit 323 or one of the terminal units 100 via the network 1 based on the operation mode information.

The resource status analyzing unit 323 analyzes the resource status list D10 of the recording device 200, which is acquired from the remote recording reservation processing unit 322, to determine a recording device 200 appropriate for a remote recording reservation site, and sends the remote recording reservation processing unit 322 a remote recording reservation instruction R8 to cause the determined recording device 200 to make remote recording reservation.

Upon receiving the remote recording reservation instruction R8 from the resource status analyzing unit 324, the remote recording reservation processing unit 322 transmits a remote recording reservation request R11 including the control-targeted device ID of the recording device 200 determined as the remote recording reservation site, the recording reservation program information D3 and the recording mode information to the controller 800 via the network 1, receives a remote recording reservation result notification R12 transmitted through the controller 800 after completion of remote recording reservation in the recording device 200, and transmits the remote recording reservation result notification R3 to the terminal unit 100.

Next, the direct access management server 400 will be described. The direct access management server 400 has the same hardware configuration as the typical computer system such as a personal computer as shown in FIG. 4, and therefore, explanation of which will be omitted.

A software configuration of the direct access management server 400 will be now described with reference to FIG. 6. The direct access management server 400 includes a storing unit 401, a registration processing unit 402, a direct access request processing unit 403 and an XMPP server 404.

The storing unit 401 stores a management ID-related table 411 in which terminal unit service management IDs, which are IDs for combination of the terminal unit 100 and the kind of service, and control-targeted device management IDs, which are IDs assigned for the recording device 200, are registered in association therebetween, a device ID-related table 412 in which terminal unit service management IDs, control-targeted device IDs for service server and control-targeted device IDs for control-targeted device are registered in association therebetween, etc.

The registration processing unit 402 registers the terminal unit service management IDs and the control-targeted device management IDs in the management ID-related table 411 and associates both of the IDs with each other. That is, the registration processing unit 402 generates the terminal unit service management IDs for the combination of the terminal unit 100 and the service provided by the service server 300, for example, according to a terminal unit service registration request R13, registers the terminal unit service management IDs in the management ID-related table 411, and transmits the terminal unit/service management IDs, as a terminal unit service registration response R14, to the service server 300 via the network 1.

Upon receiving a control-targeted device registration request R15 from the controller 800, the registration processing unit 402 assigns the control-targeted device management IDs for the controller 800 and registers the assigned control-targeted device management IDs in the management ID-related table 411 in correspondence to the terminal unit service management IDs. In addition, the registration processing unit 402 associates the generated control-targeted device management IDs, the control-targeted device IDs for service server, which are IDs allowing the service server 300 to identify the recording device 200, the control-targeted device IDs for controller, which are IDs allowing the controller 800 to identify itself, and control-targeted device names generated for individual controllers 800 with each other, and stores the association in the device ID-related table 412. An example of a method of determining which terminal unit service management IDs are associated with the control-targeted device management IDs may include a method of using a password for control-targeted device registration, as will be described below.

In this method, after the terminal unit service management IDs are registered in the direct access management server 400, the service server 300 requests the direct access management server 400 to issue a password for control-targeted device registration. Upon receiving the request, the direct access management server 400 generates the password for control-targeted device registration, stores the generated password in association with the terminal unit service management IDs, and transmits the generated password to the service server 300. The service server 300 transmits the password for control-targeted device registration to the terminal unit 100. The terminal unit 100 transmits the acquired password for control-targeted device registration to the controller 800 via a transmission unit such as the network 1. The controller 800 transmits the control-targeted device registration request R15 added with the password for control-targeted device registration to the direct access management server 400. Upon receiving the control-targeted device registration request R15, the direct access management server 400 generates the control-targeted device management IDs, compares the password for control-targeted device registration included in the control-targeted device registration request R15 with the password for control-targeted device registration stored in association with the terminal unit service management IDs, and if both of the passwords are equal to each other, stores the terminal unit service management IDs corresponding the password for control-targeted device registration in the management ID-related table 411 in association with the generated control-targeted device management IDs.

Upon receiving the direct access start request R9 including the control-targeted device ID for service server of the controller 800 from the service server 300, the direct access request processing unit 403 determines the control-targeted device management IDs assigned for the controller 800, based on the control-targeted device ID for service server of the controller 800 included in the direct access start request R9, the management ID-related table 411 and the device ID-related table 412, transmits a direct access information acquisition request R16 to request acquisition of URI (Uniform Resource Identifier) for direct access of the controller 800 via the network 1 to the controller 800 through a regular access session, based on a result of the determination, receives a direct access information acquisition response R17 including the URI for direct access from the controller 800, and transmits the direct access start response R10 including the URI for direct access to the service server 300.

Here, for example, if the controller 800 is connected to the network 1 via a router, the URI for direct access includes a global IP address and a port number mapped into a local IP address and a port number of the controller 800 in the router. However, if the controller 800 is directly connected to the network 1, the URI may be a global IP address assigned for the controller 800.

In addition, the direct access management server 400 is provided with the XMPP (extensible Messaging and Presence Protocol) server 404 to establish a bi-directional regular access session between the direct access management server 400 and the recording device 200. XMPP is a protocol to realize a real-time communication. The regular access session is established when the controller 800 logs in the XMPP server 404 before the terminal unit 100 accesses the controller 800 via the network 1. If the direct access management server 400 received the direct access start request R9 from the service server 300 having an XMPP session between the service server 300 and the XMPP server 404, the direct access management server 400 is assumed to transmit the direct access information acquisition request R16 to the controller 800 through the regular access session established between the XMPP server 404 and the controller 800.

Figure 7:
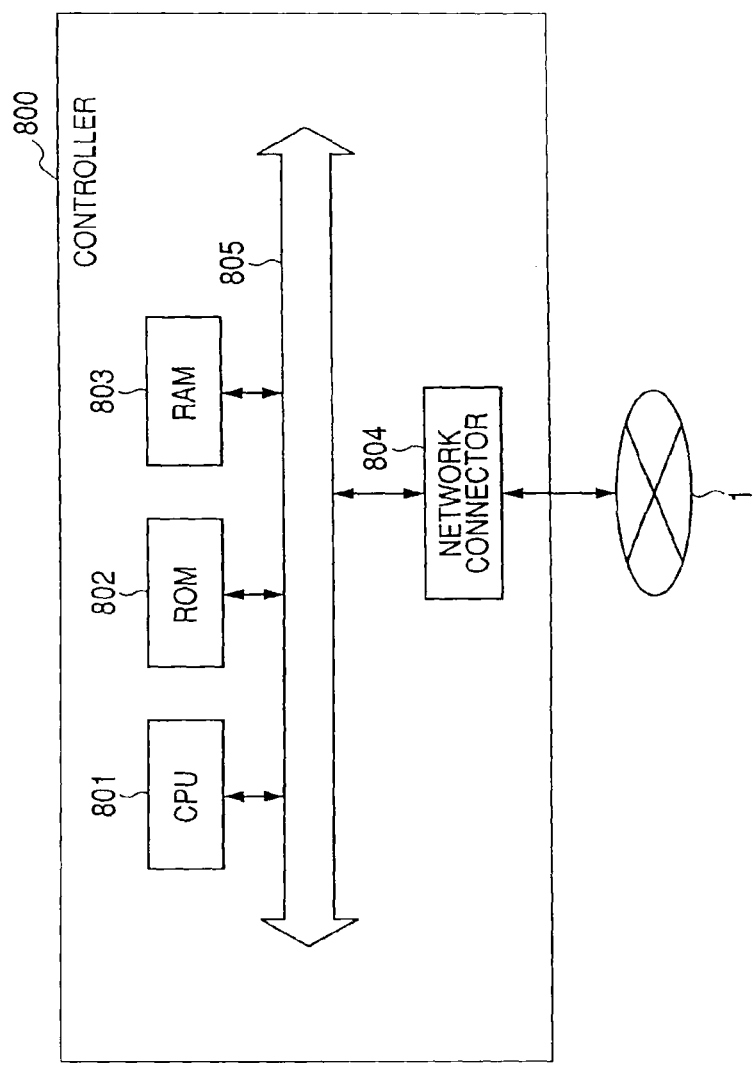
FIG. 7 is a block diagram showing a hardware configuration of a controller in FIG. 1.

FIG. 7 is a block diagram showing a hardware configuration of the controller 800. As shown in the figure, in the controller 800, a CPU 801 is connected with a ROM 802, a RAM 803 and a network connector 804 via a system bus 805. The network connector 804 is a unit for performing a communication process via the network 1. The ROM 802 stores programs and various data for software process. The CPU 801 loads programs from the ROM 802 into the RAM 803, and analyzes and executes the programs in order to perform a software process.

The controller 800 is a device which is managed, as one of control-targeted devices, by the direct access management server 400. The controller 800 may be a dedicated device, or a network device such as a router, a device installed in a recording device, or a personal computer.

Figure 8:
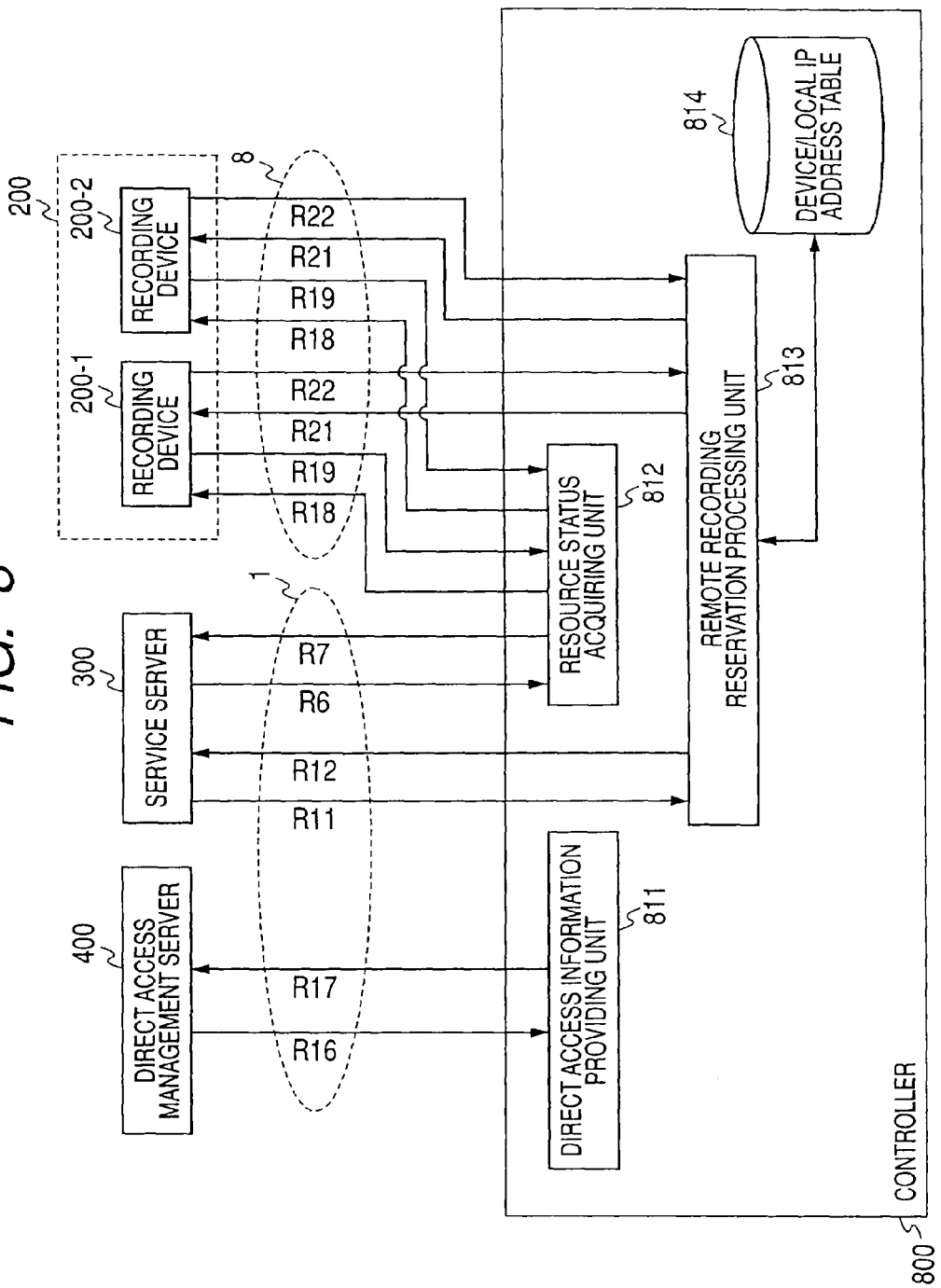
FIG. 8 is a block diagram showing a software configuration of a controller in FIG. 7.

FIG. 8 is a block diagram showing a software configuration of the controller 800. As shown in the figure, the controller 800 includes a direct access information providing unit 811, a resource status acquiring unit 812, a remote recording reservation processing unit 813 and a device/local IP address table 814.

The device/local IP address table 814 is set as the RAM 802 or the like. An example of a method of setting the device/local IP address table 814 includes a method in which a user operates to pre-register pairs of control-targeted device IDs of recording devices and local IP addresses in a table, a method in which the controller 800 detects the recording device 200 on the LAN 8 by broadcasting or the like and registers pairs of control-targeted device IDs and local IP addresses in a table, etc. In the latter, the detection of the recording device 200 on the LAN 8 is regularly performed.

The direct access information providing unit 811 logs in the XMMP server 404 of the direct access management server 400 and establishes a bidirectional regular access session between the direct access information providing unit 811 and the direct access management server 400. In addition, upon receiving the direct access information acquisition request R16 from the direct access management server 400 through the regular access session, the direct access information providing unit 811 generates an URI for direct access including a global IP address and a port number mapped into a local IP address and a port number of the controller 800 in a router connecting the controller 800 to the network 1, and transmits the direct access information acquisition response R17 including the URI for direct access to the direct access management server 400.

Upon receiving the resource status acquisition request R6 including the recording reservation program information D3 and the recording mode information from the service server 300, the resource status acquiring unit 812 transmits a resource status acquisition request R18 including the recording reservation program information D3 and the recording mode information, which are extracted from the resource status acquisition request R6, to the recording device 200

(200-1 and 200-2) connected to the controller 800 via the LAN 8. In addition, upon receiving a resource status acquisition response R19 including resource status information D7 from the recording device 200 (200-1 and 200-2) connected to the resource status acquiring unit 812 via the LAN 8, the resource status acquiring unit 812 extracts the resource status information D7 from the resource status acquisition response R19, prepares a list D10 of collected resource status information D7, and transmits the resource status acquisition response R7 including the resource status list D10 to the service server 300.

Upon receiving the remote recording reservation request R11 including the control-targeted device ID of the recording device 200 determined as the remote recording reservation site, the recording reservation program information D3 and the recording mode information from the service server 300, the remote recording reservation processing unit 813 searches a local IP address corresponding to the control-targeted device ID included in the remote recording reservation request R11 from the device/local IP address table 814, accesses the recording device 200 via the LAN 8 based on the searched local IP address, and transmits a remote recording reservation instruction R21 including the recording reservation program information D3 and the recording mode information, which are extracted from the remote recording reservation request R11, to the recording device 200 via the LAN 8.

In addition, the remote recording reservation processing unit 813 receives a remote recording reservation result notification R22 transmitted from the recording device 200 via the LAN 8 after completion of remote recording reservation in the recording device 200, and transmits the remote recording reservation result notification R12 to the service server 300 via the network 1.

Figure 9:
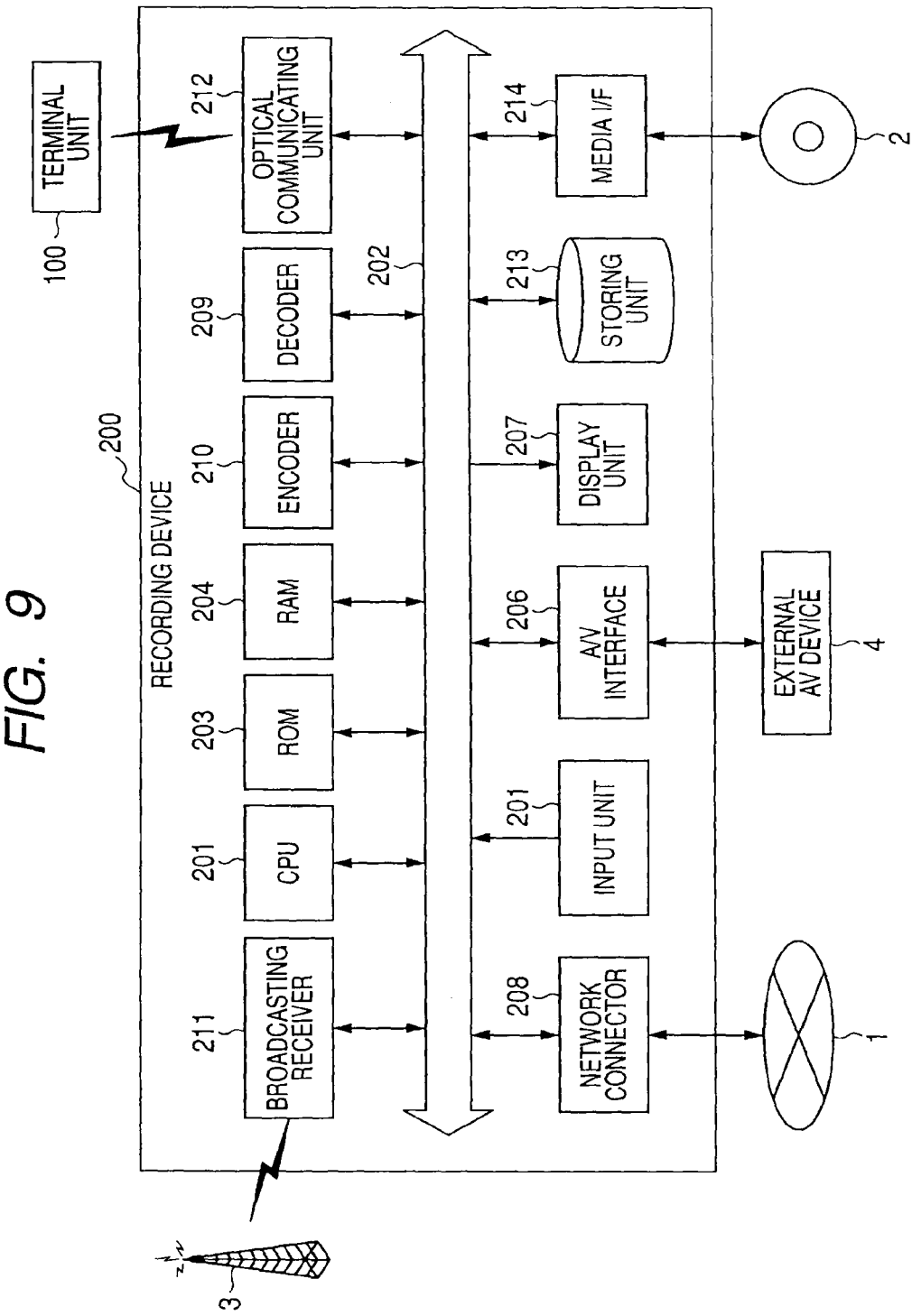
FIG. 9 is a block diagram showing a hardware configuration of a recording device in FIG. 1.

Next, the recording device 200 will be described. FIG. 9 is a block diagram showing a hardware configuration of the recording device 200.

As shown in the figure, a CPU 201 is connected with a ROM 203, a RAM 204, an input unit 205, an AV interface 206, a display unit 207, a network connecter 208, a decoder 209, an encoder 210, a broadcasting receiver 211, an optical communicating unit 212, a storing unit 213 such as a hard disk drive (HDD), and a media interface 214 via a system bus 202.

The input unit 205 has various keys and soon and processes input of various instructions for recording and reproduction from a user. The instructions inputted from the user through the input unit 205 are provided to the CPU 201 by an interface (not shown) via the system bus 202.

The display unit 207 includes a display device such as an LCD or the like and a display control circuit to drive the display device and displays confirmation of instructions and data inputted from the user, various statuses, etc.

The AV interface 206 processes input/output of video signals and audio signal between the recording device 200 and an external AV device 4 such as a television connected to the recording device 200.

The broadcasting receiver 211 receives broadcasting waves delivered from the broadcasting station 3 such as terrestrial analog television broadcasting, terrestrial digital television broadcasting, CS digital broadcasting, BS digital broadcasting and the like and demodulates video signals and audio signals.

The encoder 210 encodes a video signal and an audio signal of a broadcasting program outputted from the broadcasting receiver 211 using, for example, an MPEG2 (Moving Picture Experts Group 2) system or the like.

The network connecter 208 processes access to the network 1. The decoder 209 decodes contents data acquired from the contents delivery server 600 (see FIG. 8) via the network and encoded data of contents read from the storing unit 213 and restores digital video data and digital audio data. The restored digital video data are provided to the AV interface 206 via the system bus 202 and are outputted to the external AV device 4 such as a television connected to the AV interface 206.

The optical communicating unit 212 is an interface to process communication with an external device such as the terminal unit 100 or the like, and specifically conducts communication with the external device through wireless medium such as infrared ray, radio wave, sound wave, electromagnetic wave or the like. The communication with the terminal unit 100 may be conducted via the network 1 instead of the optical communication.

The storing unit 213 may be a hard disk drive or the like. The storing unit 213 stores the recording reservation program information D3 sent from the terminal unit 100, contents data acquired via the network 1, contents data of broadcasting program data and so on, which are received in the broadcasting receiver 211 and then encoded in the encoder 210.

A removable media 2, such as an optical disc or the like, in which contents data of broadcasting programs and the like may be written may be loaded in the media interface 214. An example of the removable media 2 may include a write-once DVD (Digital Versatile Disc), a re-recordable DVD, blue-ray disk, etc.

The ROM 203 stores programs and so on for process of software to be executed by the recording device 200. The RAM 204 is a writable volatile memory used to load a program code executed by the CPU 201 or write work data of programs. The CPU 201 loads programs from the ROM 203 into the RAM 204, and analyzes and executes the programs in order to perform a software process to be executed by the recording device 200.

Next, a software configuration of the recording device 200 will be described with reference to FIG. 10.

As shown in the figure, the recording device 200 includes a remote recording reservation processing unit 221, a recording reservation information storing unit 222, a contents data acquiring unit 223, a contents data storing unit 224, a resource status providing unit 225, etc. Here, the recording reservation information storing unit 222 and the contents data storing unit 224 are set as the storing unit 213 or the removable media 2 loaded into the media interface 214.

Upon receiving the resource status acquisition request R18 from the controller 800 via the LAN 8, the resource status providing unit 225 determines whether or not remote recording reservation is present according to resource status, based on the recording reservation program information D3 and the recording mode information included in the resource status acquisition request R18, empty capacity of the contents data storing unit 224, the recording reservation list stored in the recording reservation information storing unit 222, etc., and transmits the resource status acquisition response R19 including the determined resource status information D7 to the controller 800 via the LAN 8.

Upon receiving the remote recording reservation instruction R21 from the controller 800, the remote recording reservation processing unit 221 registers the recording reservation program information D3 and the recording mode information, which are included in the remote recording reservation instruction R21, in a recording reservation list stored in the recording reservation information storing unit 222, and after completion of the registration, transmits the remote recording reservation result notification R22 indicating completion of the remote recording reservation to the service server 300 via the network 1.

Based on the recording reservation program information D3 stored in the recording reservation list in the recording reservation information storing unit 222, the contents data acquiring unit 223 selectively receives contents data D8 delivered from the contents delivery server 600 or contents data D9 of broadcasting programs broadcasted from the broadcasting station 3 and records the received contents data in the contents data storing unit 224.

Next, an operation when the terminal unit 100 makes remote recording reservation for the recording device 200 using the service provided by the service server 300 in the network system 10 of this embodiment will be described.

Figure 11:
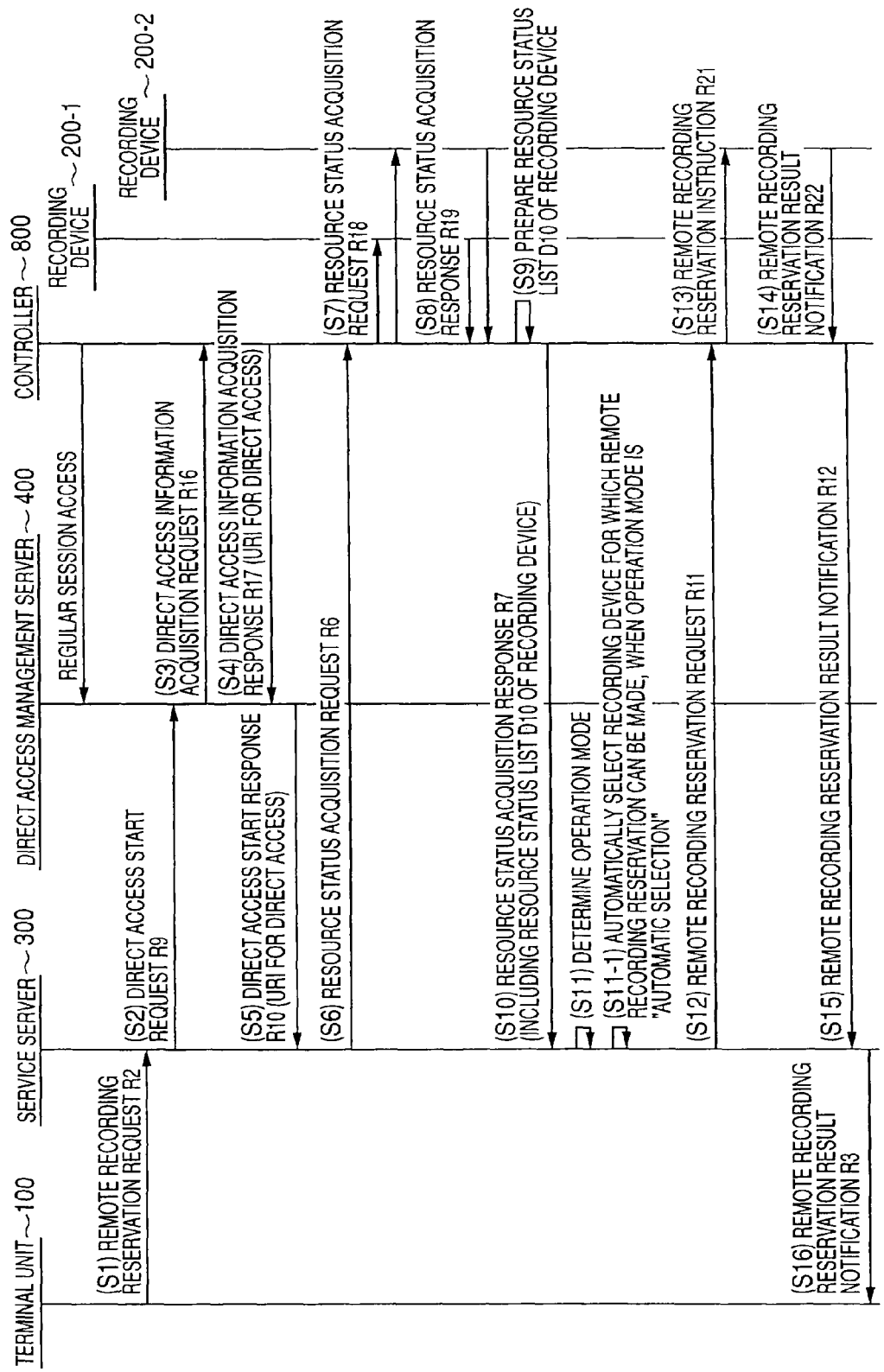
FIG. 11 is a view showing an operation sequence of remote recording reservation when an operation mode "Automatic selection" is selected in the network system according to the first embodiment of the invention.

FIG. 11 is a view showing an operation sequence of remote recording reservation when "Automatic selection" is selected as an operation mode when the recording device 200 for which remote recording reservation can be made is selected.

Figure 3:
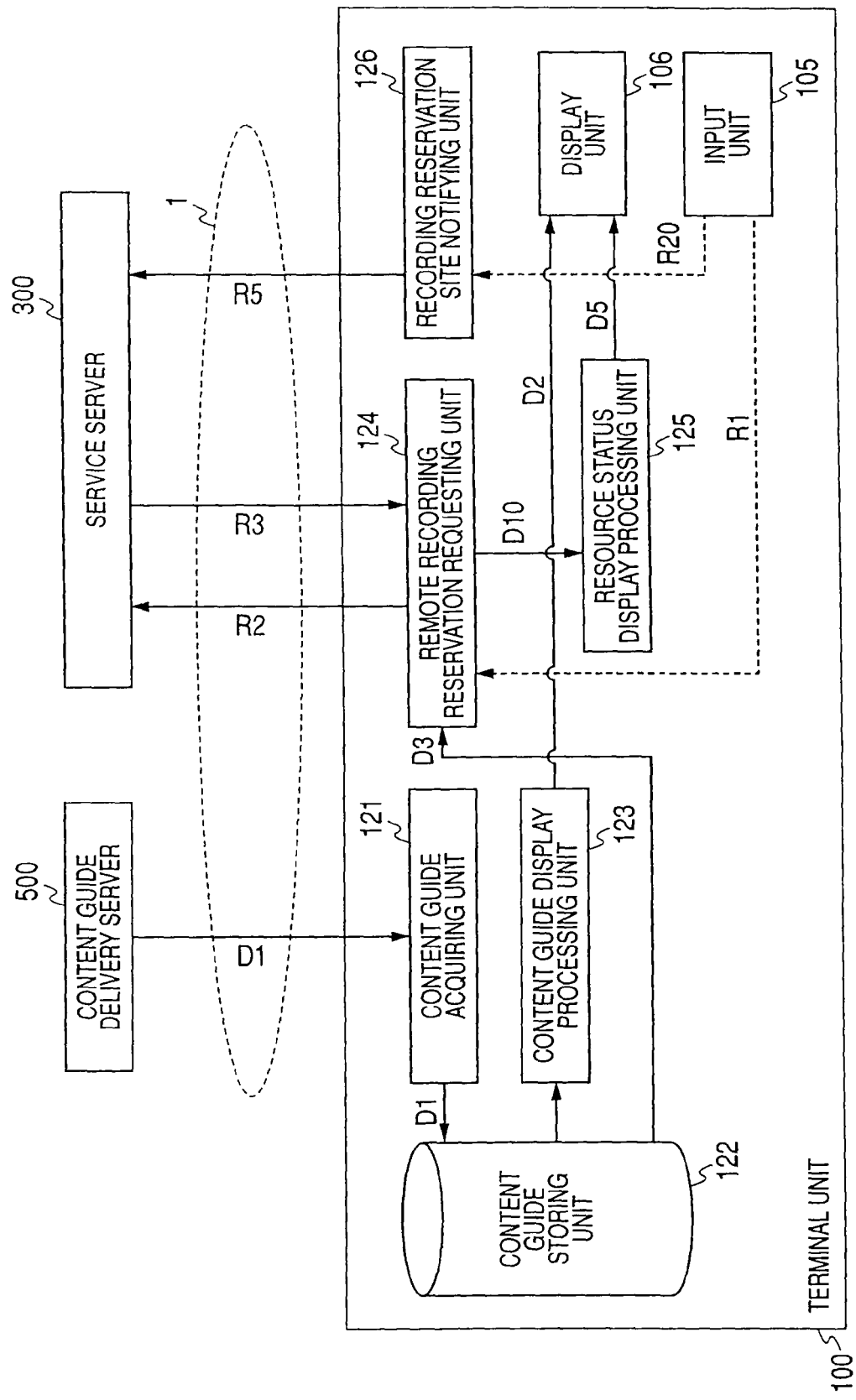
FIG. 3 is a block diagram showing a software configuration of a terminal unit in FIG. 2.

First, in FIG. 3, a contents guide acquired from the contents guide delivery server 500 is displayed on the display unit 106 of the terminal unit 100. For the displayed contents guide, when a user selects contents as an object of remote recording reservation, a recording mode and an operation mode and instructs a remote recording reservation through the input unit 105, the remote recording reservation instruction R1 including information on the selected contents, recording mode and operation mode is inputted to the remote recording reservation requesting unit 124. Upon receiving the remote recording reservation instruction R1, the remote recording reservation requesting unit 124 extracts the recording reservation program information D3, such as program ID, channel name, broadcasting date, broadcasting start/end time, title name and the like, required for remote recording reservation of contents as an object of remote recording reservation, from the contents guide data D1 stored in the contents guide storing unit 122, and transmits the remote recording reservation request R2 including the extracted recording reservation program information D3, the recording mode information and operation mode information included in the remote recording reservation instruction R1, and the control-targeted device ID for service server of the controller 800 to the service server 300 via the network 1 (S1 in FIG. 11).

Figure 5:
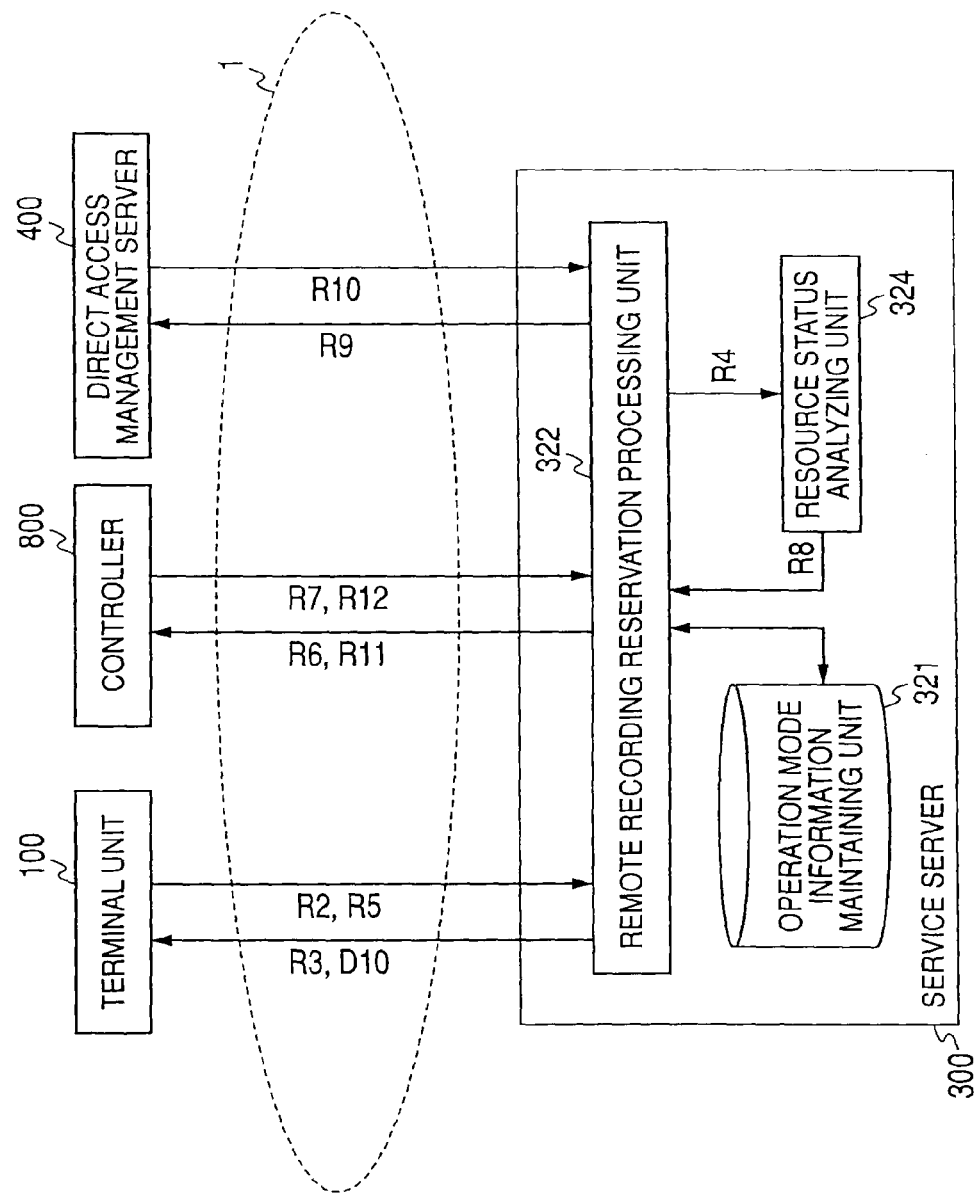
FIG. 5 is a block diagram showing a software configuration of a service server in FIG. 1.

In FIG. 5, upon receiving the remote recording reservation request R2 from the terminal unit 100, the remote recording reservation processing unit 322 in the service server 300 extracts the control-targeted device ID for service server of the controller 800 from the remote recording reservation request R2 and transmits the direct access start request R9 including the extracted control-targeted device ID for the service server of the controller 800 to the direct access management server 400 via the network 1 (S2 in FIG. 11). In addition, the remote recording reservation processing unit 322 maintains the operation mode information, which is extracted from the remote recording reservation request R2, in the operation mode information maintaining unit 321.

Figure 6:
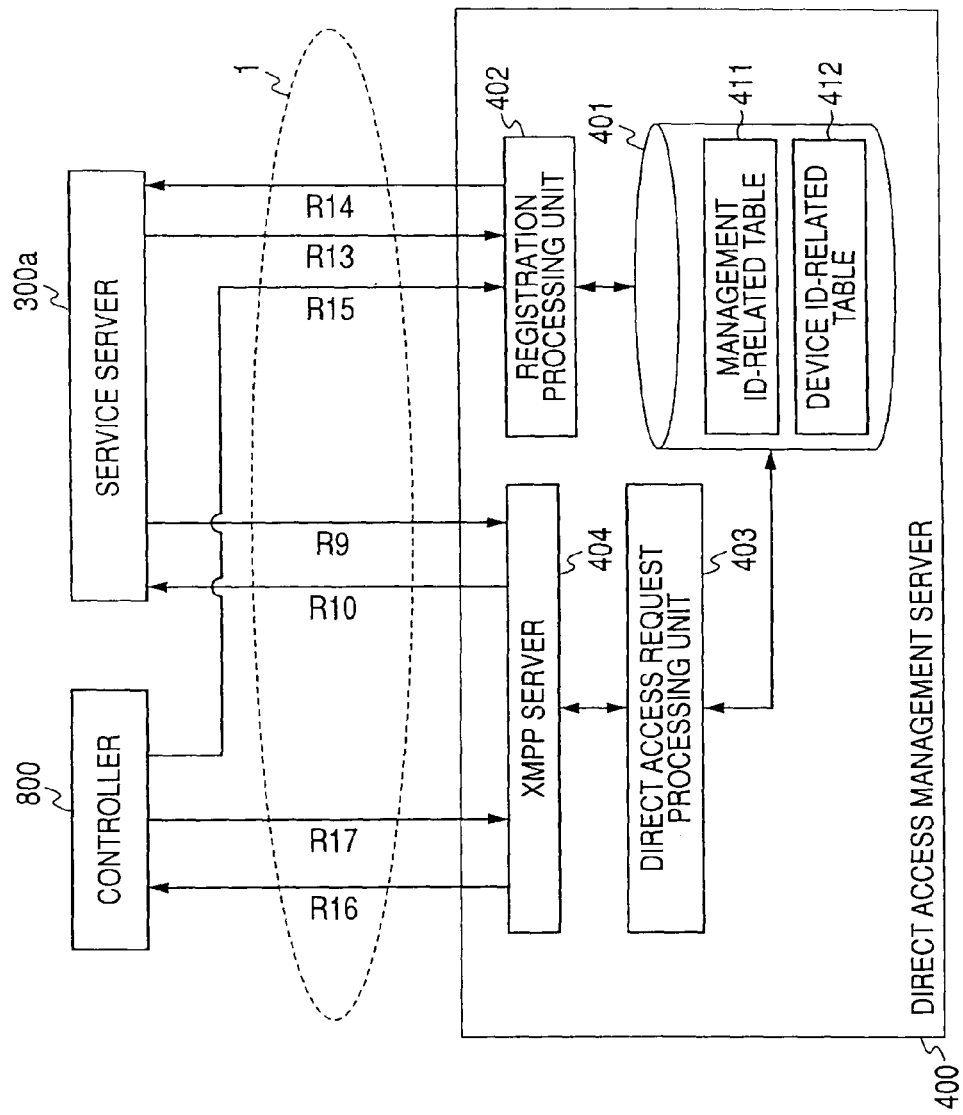
FIG. 6 is a block diagram showing a software configuration of a direct access management server in FIG. 1.

In FIG. 6, upon receiving the direct access start request R9 from the service server 300 through regular access session, the direct access request processing unit 403 in the direct access management server 400 determines the control-targeted device management IDs assigned for the controller 800, based on the control-targeted device ID for service server of the controller 800 included in the direct access start request R9, the management ID-related table 411 and the device ID-related table 412, transmits the direct access information acquisition request R16 to request acquisition of URI for direct access of the controller 800 to the controller 800 through the regular access session (S3 in FIG. 11).

In FIG. 8, the direct access information providing unit 811 in the controller 800 logs in the XMMP server 404 of the direct access management server 400 and completes to establish a bidirectional regular access session between the direct access information providing unit 811 and the direct access management server 400. In this embodiment, the controller 800 is assumed to be connected to the network 1 via a router.

Upon receiving the direct access information acquisition request R16 from the direct access management server 400 through the regular access session, the direct access information providing unit 811 in the controller 800 generates an URI for direct access including a global IP address and a port number mapped into a local IP address and a port number of the controller 800 in the router, and transmits the direct access information acquisition response R17 including the URI for direct access to the direct access management server 400 through the regular access session (S4 in FIG. 11).

In FIG. 6, upon receiving the direct access information acquisition response R17 from the controller 800 through the regular access session, the direct access request processing unit 403 in the direct access management server 400 transmits the URI for direct access included in the direct access information acquisition response R17, as the direct access start response R10, to the service server 300 which is a direct access start request source (S5 in FIG. 11).

In FIG. 5, upon receiving the direct access start response R10 from the direct access management server 400, the remote recording reservation processing unit 322 in the service server 300 accesses the controller 800 based on the URI for direct access of the controller 800, which is included in the direct access start response R10, and transmits the resource status acquisition request R6 including the recording reservation program information D3 and the recording mode information to the controller 800 (S6 in FIG. 11).

In FIG. 8, upon receiving the resource status acquisition request R6 from the service server 300, the resource status acquiring unit 812 in the controller 800 transmits the resource status acquisition request R18 including the recording reservation program information D3 and the recording mode information, which are extracted from the resource status acquisition request R6, to the recording device 200 (200-1 and 200-2) connected to the controller 800 via the LAN 8 (S7 in FIG. 11).

Figure 10:
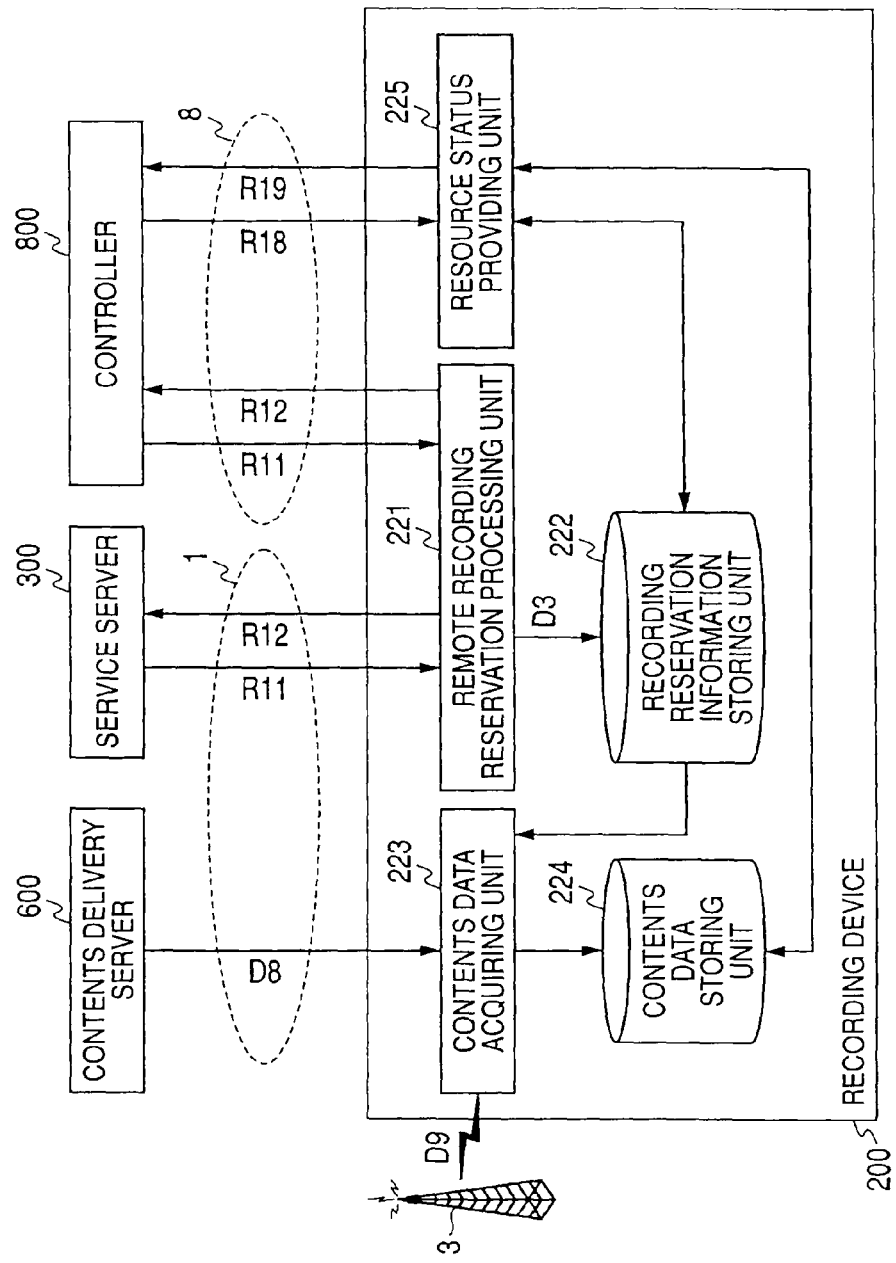
FIG. 10 is a block diagram showing a software configuration of a recording device in FIG. 9.

In FIG. 10, upon receiving the resource status acquisition request R18 from the controller 800, the resource status providing unit 225 in the recording device 200 (200-1 and 200-2) determines whether or not remote recording reservation is present according to resource status, based on the recording reservation program information D3 and the recording mode information included in the resource status acquisition request R18, the recording reservation list stored in the recording reservation information storing unit 222, empty capacity of the contents data storing unit 224, etc., and transmits the resource status acquisition response R19 including a result of the determination as the resource status information D7 to the controller 800 via the LAN 8 (S8 in FIG. 11).

The determination on whether or not remote recording reservation is present according to resource status may be made as follows. The resource status providing unit 225 calculates capacity required for recording of contents as an object of recording reservation from the recording reservation program information D3 and the recording mode information included in the resource status acquisition request R18, and if there remains no empty capacity to record the contents in the contents data storing unit 224 of the recording device 200, determines remote recording reservation as impossible. In addition, the resource status providing unit 225 determines an empty situation of a tuner as a broadcasting reception resource from the recording reservation program information D3 and the recording reservation list stored in the recording reservation information storing unit 222, and if there is no empty space in the tuner to be used to receive the recording-reserved contents, determines the remote recording reservation as impossible. If there is a sufficient empty space in the contents data storing unit 224 and thus it is possible to use the tuner, the resource status providing unit 225 determines possibility of remote recording reservation as a resource status. In addition, upon determining that recording reservation has been already made for the same contents as the object of remote recording reservation indicated by the recording reservation program information D3, the resource status providing unit 225 is assumed to add the fact that there exists the overlapped recording reservation to the resource status information indicating the possibility of remote recording reservation.

In FIG. 8, upon receiving the resource status acquisition response R19 from the recording device 200 (200-1 and 200-2) connected to the resource status acquiring unit 812 via the LAN 8, the resource status acquiring unit 812 in the controller 800 extracts the resource status information D7 from the resource status acquisition response R19, prepares the list D10 of collected resource status of the recording device 200 (200-1 and 200-2) (S9 in FIG. 11), and transmits the resource status list D10, as the resource status acquisition response R7, to the service server 300 (S10 In FIG. 11). The resource status list D10 includes control-targeted device IDs for service server, control-targeted device names and resource status information for each recording device 200.

In FIG. 5, upon receiving the resource status acquisition response R7 from the direct access management server 400, the remote recording reservation processing unit 322 in the service server 300 extracts the resource status list D10 from the resource status acquisition response R7, and determines an operation mode based on the operation mode information maintained in the operation mode information maintaining unit 321 (S11 in FIG. 11).

In FIG. 5, upon determining that the operation mode is "Automatic selection", the remote recording reservation processing unit 322 in the service server 300 transmits a resource status analysis instruction R4 including the resource status list D10, which is extracted from the resource status acquisition response R7, to the resource status analyzing unit 323 in the service server 300. Upon receiving the resource status analysis instruction R4, the resource status analyzing unit 323 determines a recording device 200 most appropriate for a remote recording reservation site based on the resource status list D10 included in the resource status analysis instruction R4 (S11-1 in FIG. 11). The determination on recording device 200 most appropriate for the remote recording reservation site may be made as follows.

If there is just one recording device 200 for which remote recording can be reserved in the resource status list D10, the resource status analyzing unit 323 determines the very recording device 200 as the recording device 200 most appropriate for the remote recording reservation site. If there is a plurality of recording devices 200 for which remote recording can be reserved, the resource status analyzing unit 323 determines one of the plurality of recording devices 200 as the recording device 200 most appropriate for the remote recording reservation site. In this case, selection of one recording device 200 may be randomly made by the remote recording reservation processing unit 322 in the service server 300 or may be made according to priority preset by a user. If there exists overlapped recording reservation in one recording device 200, the resource status analyzing unit 323 instructs the remote recording reservation processing unit 322 to inform the terminal unit 100 that there exists overlapped recording reservation. Upon receiving this instruction, the remote recording reservation processing unit 322 transmits a remote recording reservation result notification indicating that there exists overlapped recording reservation to the terminal unit 100 via the network 1, placing the subsequent process in the hand of a user of the terminal unit 100. In this case, the user of the terminal unit 100 selects whether the remote recording reservation is cancelled or progressed and notifies the service server 300 of the selection through the terminal unit 100. According to this notification, the remote recording reservation processing unit 322 in the service server 300 determines whether the remote recording reservation process is continued or stopped.

Now, the following description will be given with the assumption that the recording device 200-2 is determined as the most appropriate remote recording reservation site. The resource status analyzing unit 323 sends the remote recording reservation instruction R8 including the control-targeted device ID for service server of the recording device 200-2 to the remote recording reservation processing unit 322 to make remote recording reservation for the recording device 200-2. Upon receiving the remote recording reservation instruction R8, the remote recording reservation processing unit 322 extracts the control-targeted device ID for service server of the recording device 200-2 from the remote recording reservation instruction R8, and transmits the remote recording reservation request R11 including the control-targeted device ID for service server of the recording device 200-2 to the controller 800 via the network 1 (S12 in FIG. 11).

Upon receiving the remote recording reservation request R11 from the service server 300, the remote recording reservation processing unit 813 in the controller 800 searches a local IP address corresponding to the control-targeted device ID included in the remote recording reservation request R11 from the device/local IP address table 814, accesses the recording device 200 via the LAN 8 based on the searched local IP address, and transmits the remote recording reservation instruction R21 including the recording reservation program information D3 and the recording mode information, which are extracted from the remote recording reservation request R21, to the recording device 200 via the LAN 8 (S13 in FIG. 11).

In FIG. 10, upon receiving the remote recording reservation instruction R21 from the service server 300, the remote recording reservation processing unit 221 in the recording device 200-2 registers the recording reservation program information D3 and the recording mode information, which are included in the remote recording reservation instruction R21, in a recording reservation list stored in the recording reservation information storing unit 222, and then transmits the remote recording reservation result notification R22 indicating completion of the remote recording reservation to the controller 800 via the LAN 8 (S14 in FIG. 11).

Upon receiving the remote recording reservation result notification R22 from the recording device 200-2 via the LAN 8, the remote recording reservation processing unit 813 in the controller 800 transmits the remote recording reservation result notification R12 to the service server 300 via the network 1 (S15 in FIG. 11).

In FIG. 5, upon receiving the remote recording reservation result notification R12 from the service server 300, the remote recording reservation processing unit 322 in the service server 300 transmits the remote recording reservation result notification R3 to the terminal unit 100, which is a remote recording reservation request source, via the network 1 (S16 in FIG. 11).

Hitherto, the operation when "Automatic selection" is selected as the operation mode of the recording device 200 for which remote recording reservation can be made has been described.

Figure 12:
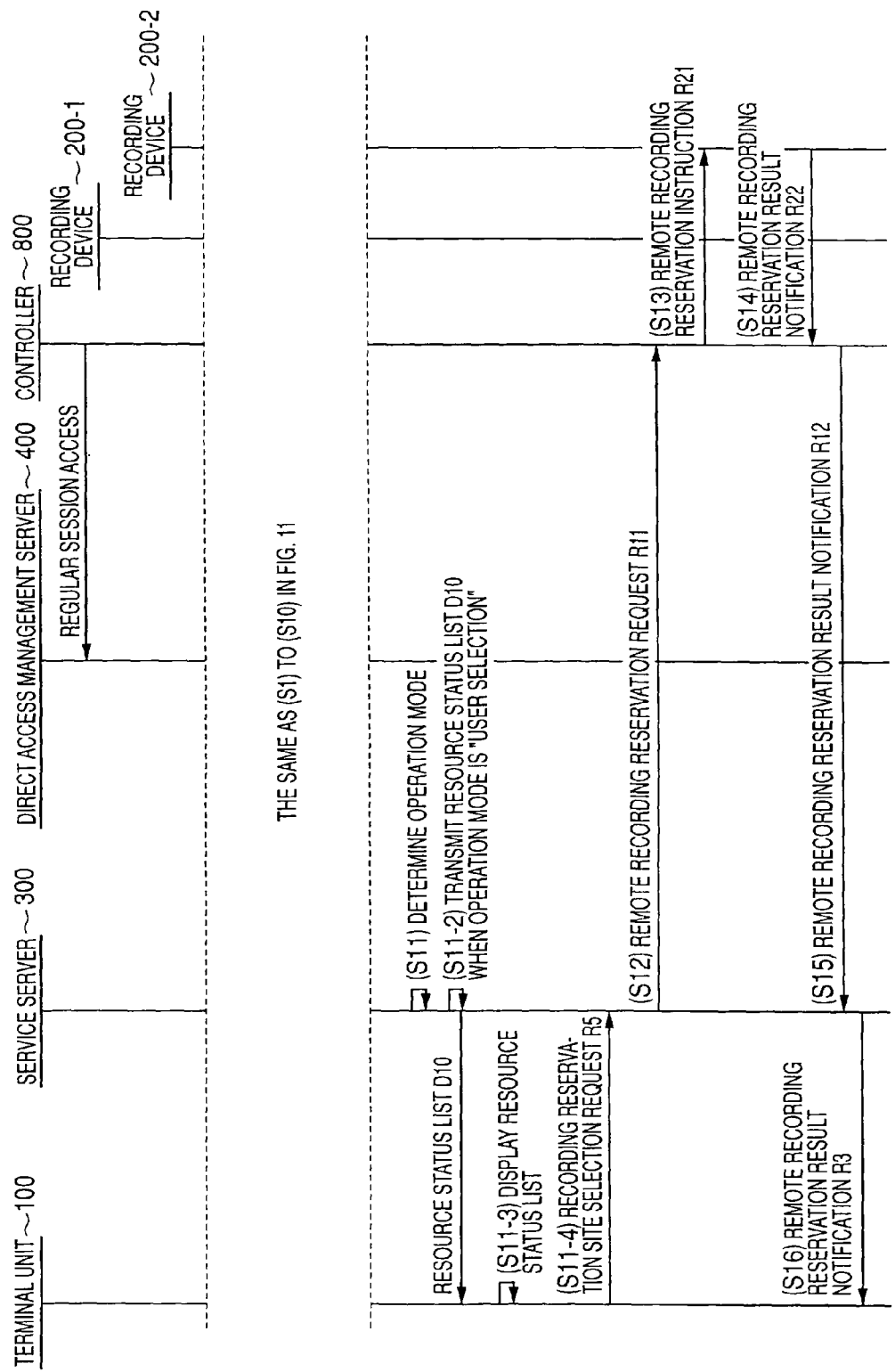
FIG. 12 is a view showing an operation sequence of remote recording reservation when an operation mode "User selection" is selected in the network system according to the first embodiment of the invention.

Next, an operation when "User selection" is selected as an operation mode of the recording device 200 for which remote recording reservation can be made will be described. FIG. 12 is a view showing an operation sequence of remote recording reservation in this case. Since steps from S1 to S10 are equal to those in FIG. 11, explanation of which will be omitted.

In FIG. 5, upon determining in S1 that the operation mode is "User selection", the remote recording reservation processing unit 322 in the service server 300 transmits the resource status list D10 of the recording device 200 (200-1 and 200-2), which is received from the controller 800, to the terminal unit 100 via the network 1 (S11-2 in FIG. 12).

In FIG. 3, the remote recording reservation requesting unit 124 in the terminal unit 100 sends the resource status list D10, which is received from the service server 300, to the resource status display processing unit 125. The resource status display processing unit 125 generates the display data D5 of the resource status list D10 acquired from the remote recording reservation requesting unit 124 and displays the generated display data D5 on the display unit 106 (S11-3 in FIG. 12).

Thereafter, as a user selects the recording device 200 most appropriate for a remote recording reservation site through the input unit 105 by referring to the resource status list displayed on the display unit 106 and inputs a recording reservation selection instruction, the recording reservation site selection instruction R20 including the control-targeted device ID for service server of the selected recording device 200 at the remote recording reservation site is given to the recording reservation notifying unit 126. Upon receiving the recording reservation site selection instruction R20, the recording reservation notifying unit 126 extracts the control-targeted device ID for service server of the recording device 200 at the remote recording reservation site from the recording reservation site selection instruction R20 and transmits the recording reservation site selection request R5 including the extracted control-targeted device ID for service server to the service server 300 via the network 1 (S11-4 in FIG. 12). Here, the following description will be given with the assumption that the recording device 200-2 is selected as a remote recording reservation site by a user.

In FIG. 5, upon receiving the remote recording reservation site selection request R5 from the terminal unit 100, the remote recording reservation processing unit 322 in the service server 300 extracts the control-targeted device ID for service server of the recording device 200-2 at the remote recording reservation site from the remote recording reservation site selection request R5, and transmits the remote recording reservation request R11 including the control-targeted device ID to the controller 800 via the network 1 (S12 in FIG. 12).

Since the subsequent steps are equal to the steps from S13 to S16 in FIG. 11, explanation of which will be omitted.

As described above, as the controller 800 collects the information on remote recording reservation according resource status of the recording device 200 connected to the controller 800 via the LAN 8 and transmits the resource status list of the recording device 200 to the service server 300, the service server 300 can automatically select the recording device 200 most appropriate for the remote recording reservation site based on the information on the resource status of the recording device 200, or the terminal unit 100, which is the remote recording reservation request source, can acquire the resource status information from the service server 300 and select the recording device 200 most appropriate for the remote recording reservation site based on the acquired resource status information. That is, from the standpoint of resource status of the recording device 200, it is possible to make remote recording reservation for the recording device 200 most appropriate for the remote recording reservation site over the network.

Next, a second embodiment of the invention will be described.

In this embodiment, a controller 800a collects information on remote recording reservation according resource status of the recording device 200 connected to the controller 800a via the LAN 8, automatically selects the recording device 200 most appropriate for the remote recording reservation site based on a list of resource status information of the recording device 200, and transmits a remote recording reservation instruction to the recording device 200 via the LAN 8.

Figure 13:
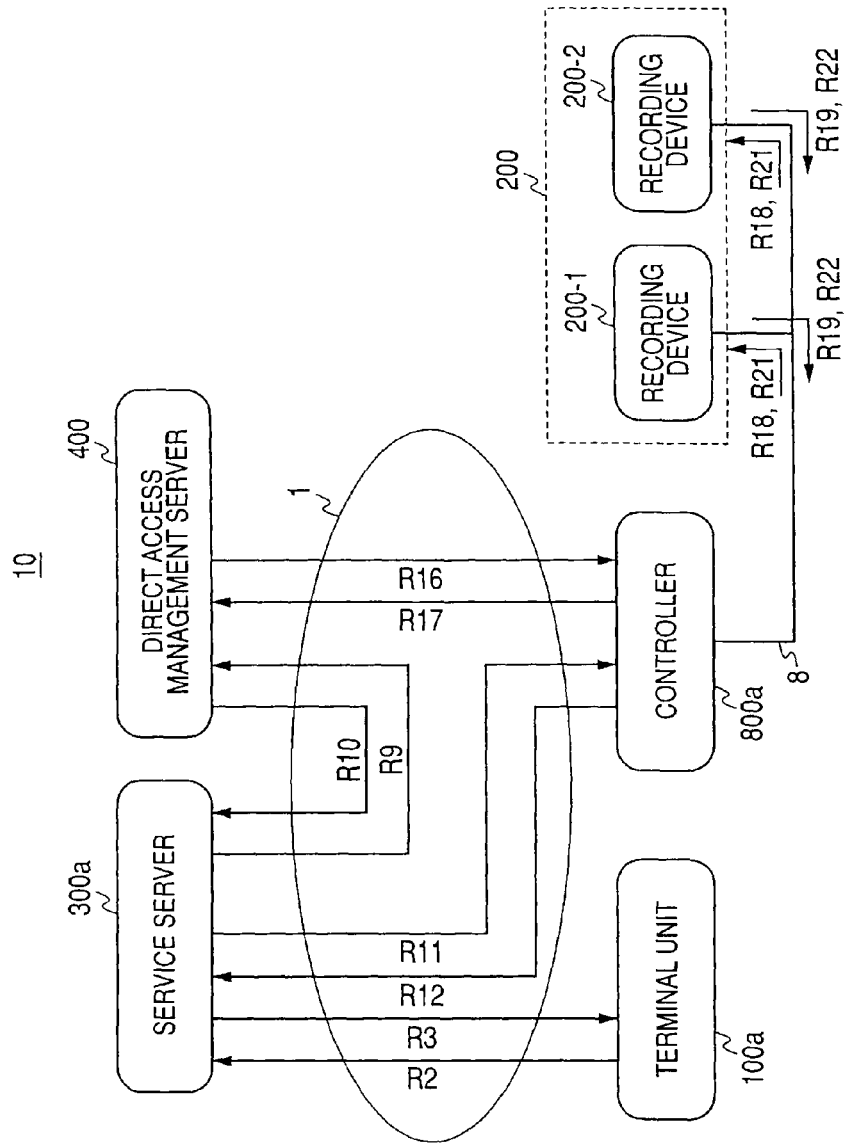
FIG. 13 is a view showing the overall configuration of a network system according to a second embodiment of the invention.

FIG. 13 is a view showing the overall configuration of a network system 20 according to a second embodiment of the invention.

The network system 20 includes a terminal unit 100a, a service server 300a, the direct access management server 400 and the controller 800a, all of which are interconnected for communication via the network 1 such as Internet. One or more recording devices 200 (200-1 and 200-2) may be connected to the controller 800a via the LAN (Local Area Network) 8.

Since the configuration of the terminal unit 100a, the recording device 200, the service server 300a, the direct access management server 400 and the controller 800a is equal to that in the first embodiment, explanation of which will be described. Also, the software configuration of the direct access management server 400 is equal to that in the first embodiment, explanation of which will be described. The software configuration of the recording device 200 is also equal to that in the first embodiment, explanation of which will be described.

Figure 14:
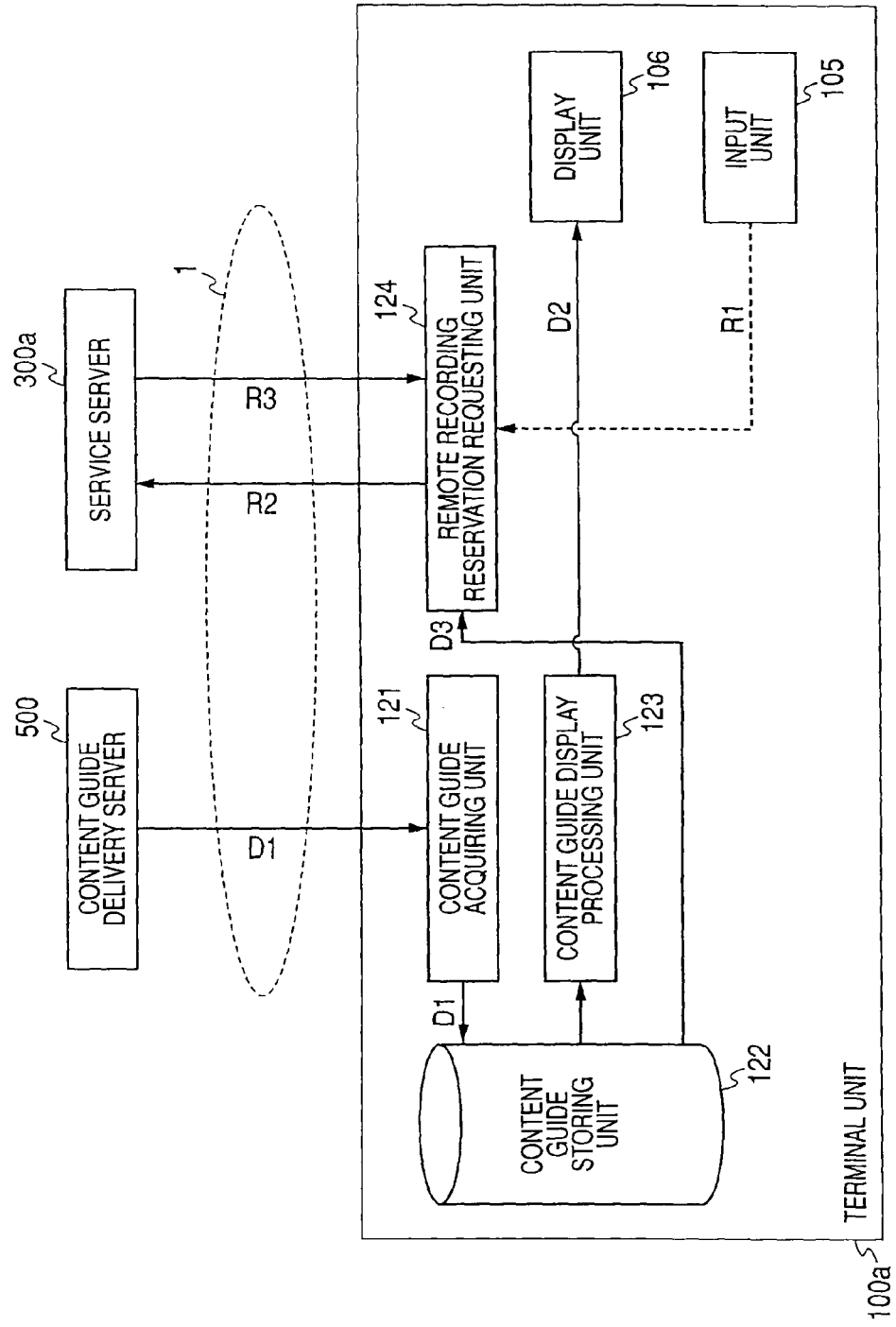
FIG. 14 is a block diagram showing a software configuration of a terminal unit in FIG. 13.

FIG. 14 is a block diagram showing a software configuration of the terminal unit 100a. As shown in the figure, the software configuration of the terminal unit 100a is equivalent to the exclusion of the resource status display processing unit 125 and the recording reservation notifying unit 126 from the software configuration of the terminal unit 100 (see FIG. 3) in the first embodiment.

Figure 15:
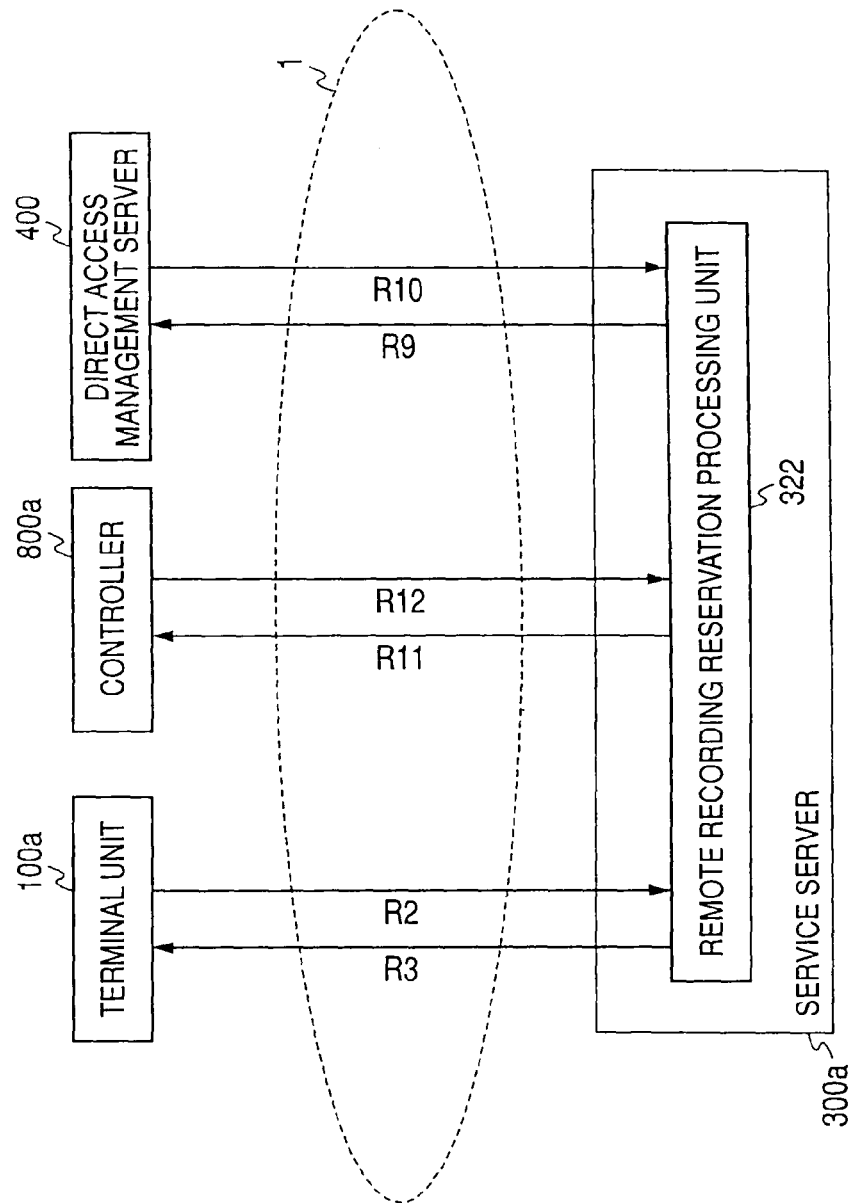
FIG. 15 is a block diagram showing a software configuration of a service server in FIG. 13.

FIG. 15 is a block diagram showing a software configuration of the service server 300a. As shown in the figure, the software configuration of the service server 300a is equivalent to the exclusion of the operation mode information retaining unit 321 and the resource status analyzing unit 324 from the software configuration of the service server 300 (see FIG. 5) in the first embodiment.

Figure 16:
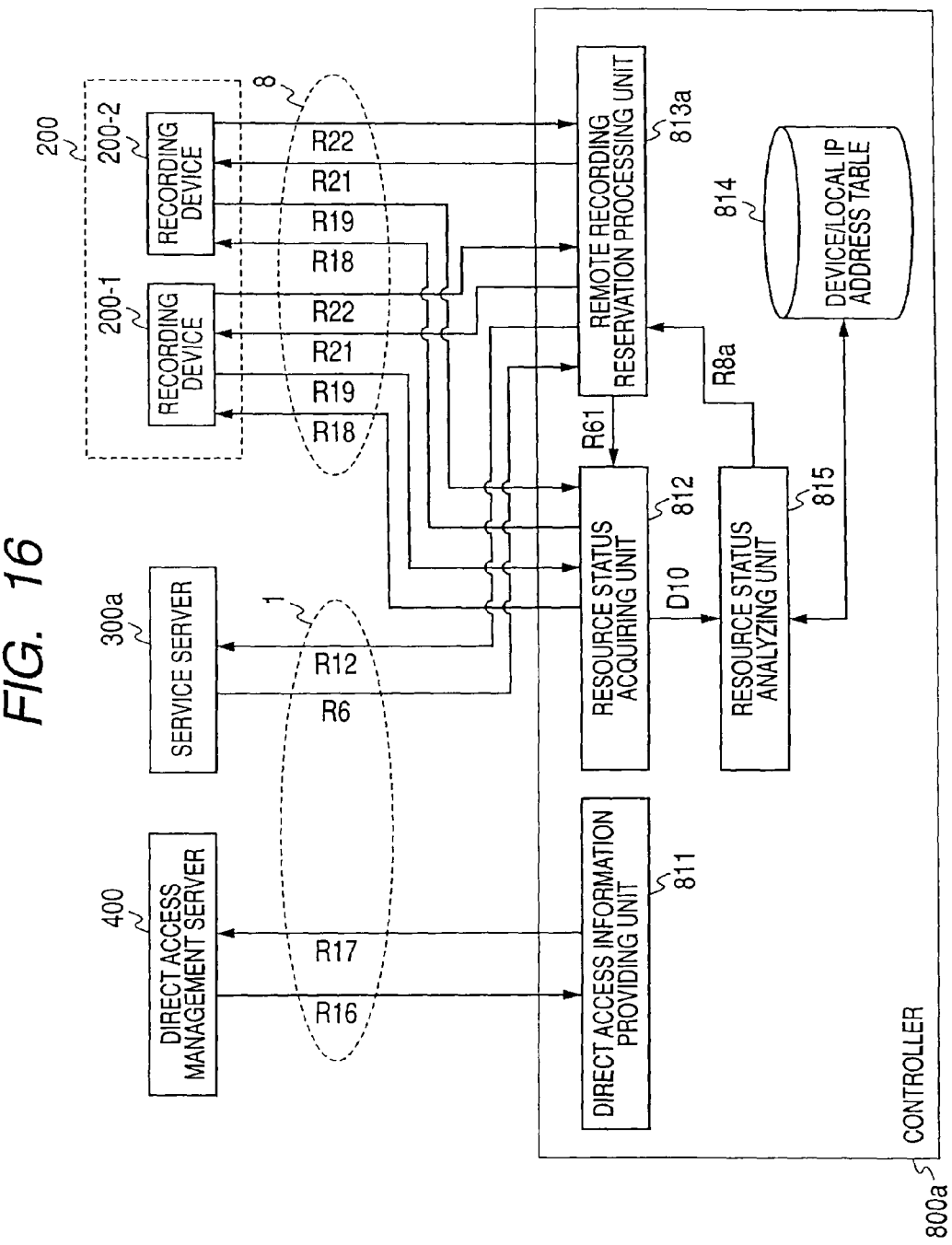
FIG. 16 is a block diagram showing a software configuration of a controller in FIG. 13.

FIG. 16 is a block diagram showing a software configuration of the controller 800a. The software configuration of the controller 800a is equivalent to the addition of a resource status analyzing unit 815 to the software configuration of the controller 800 (see FIG. 8) in the first embodiment. Some of operations of a remote recording reservation processing unit 813a in the controller 800a are different from those of the remote recording reservation processing unit 813 in the controller 800 in the first embodiment.

Upon receiving the resource status acquisition request R6 from the service server 300a, the remote recording reservation processing unit 813a outputs a resource status acquisition request transmission instruction R61 including recording reservation program information D3 and recording mode information, which are extracted from the resource status acquisition request R6, to the resource status acquiring unit 812. Upon receiving the resource status acquisition request transmission instruction R61, the resource status acquiring unit 812 transmits the resource status acquisition request R18 including the recording reservation program information D3 and the recording mode information to the recording device 200 (200-1 and 200-2) connected to the controller 800a via the LAN 8. Upon receiving the resource status acquisition response R19 from the recording device 200 (200-1 and 200-2) connected to the resource status acquiring unit 812 via the LAN 8, the resource status acquiring unit 812 in the controller 800a extracts the resource status information D7 from the resource status acquisition response R19, prepares the list D10 of collected resource status of the recording device 200 (200-1 and 200-2), and transmits the resource status list D10, along with the recording reservation program information D3 and the recording mode information included in the resource status acquisition request transmission instruction R61, to the resource status analyzing unit 815.

The resource status analyzing unit 815 analyzes the list D10 of collected resource status information D7 of the recording device 200 (200-1 and 200-2) connected to the resource status analyzing unit 815 via the LAN 8, which is obtained by the resource status acquiring unit 812, to determine the recording device 200 most appropriate for the remote recording reservation site, and sends a remote recording reservation instruction R8a including a local IP address of the recording device 200 most appropriate for the remote recording reservation site, the recording reservation program information D3 and the recording mode information to the remote recording reservation processing unit 813a to make remote recording reservation for the recording device 200.

Upon receiving the remote recording reservation instruction R8a from the resource status analyzing unit 815, the remote recording reservation processing unit 813a accesses the recording device 200 via the LAN 8 based on the local IP address included in the remote recording reservation instruction R8a, and sends the remote recording reservation instruction R21 including the recording reservation program information D3 and the recording mode information, which are extracted from the remote recording reservation instruction R8a, to the recording device 200 via the LAN 8.

In addition, the remote recording reservation processing unit 813a receives a remote recording reservation result notification R22 transmitted from the recording device 200 via the LAN 8 after completion of remote recording reservation in the recording device 200, and transmits the remote recording reservation result notification R12 to the service server t 300a via the network 1.

Next, an operation when the terminal unit 100a makes remote recording reservation for the recording device 200 using the service provided by the service server 300a in the network system 20 of the second embodiment will be described.

Figure 17:
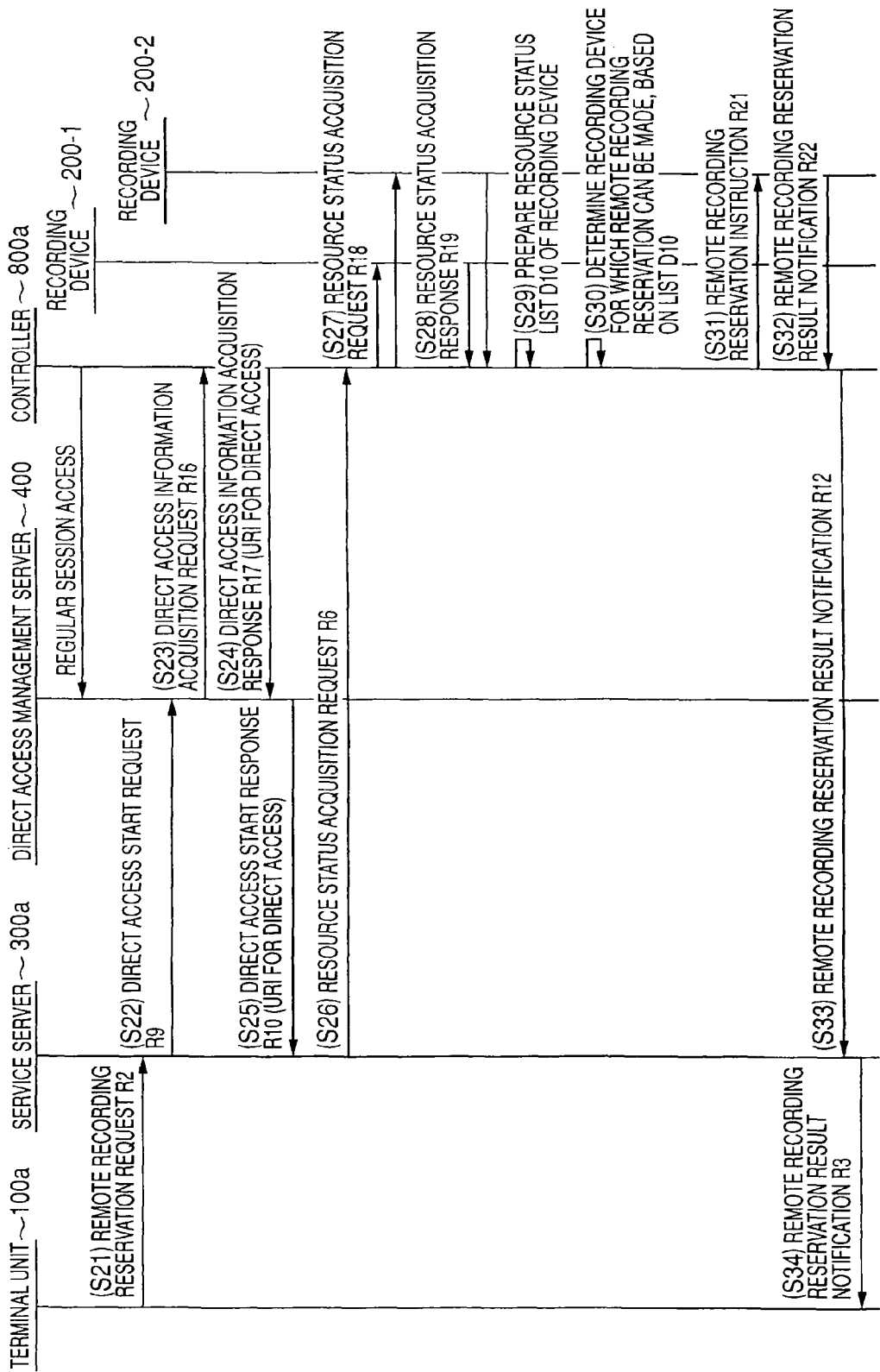
FIG. 17 is a view showing an operation sequence of remote recording reservation in the network system according to the second embodiment of the invention.

FIG. 17 is a view showing an operation sequence of the remote recording reservation.

First, in FIG. 14, the terminal unit 100a transmits the remote recording reservation request R2, which includes the recording reservation program information D3 and the recording mode information related to contents as an object of remote recording reservation, and a control-targeted device ID for service server of the controller 800a, to the service server 300a via the network 1 (S21 in FIG. 17).

In FIG. 15, upon receiving the remote recording reservation request R2 from the terminal unit 100a, the remote recording reservation processing unit 322 in the service server 300a extracts the control-targeted device ID for service server of the controller 800a from the remote recording reservation request R2 and transmits the direct access start request R9 including the extracted control-targeted device ID for the service server of the controller 800a to the direct access management server 400 via the network 1 (S22 in FIG. 17).

In FIG. 6, upon receiving the direct access start request R9 from the service server 300a through regular access session, the direct access request processing unit 403 in the direct access management server 400 determines the control-targeted device management IDs assigned for the controller 800a, based on the control-targeted device ID for service server of the controller 800a included in the direct access start request R9, the management ID-related table 411 and the device ID-related table 412, transmits the direct access information acquisition request R16 to request acquisition of URI for direct access of the controller 800a to the controller 800a through the regular access session (S23 in FIG. 17).

In FIG. 16, the direct access information providing unit 811 in the controller 800a logs in the XMMP server 404 of the direct access management server 400 and completes to establish a bidirectional regular access session between the direct access information providing unit 811 and the direct access management server 400. In this embodiment, the controller 800a is assumed to be connected to the network 1 via a router.

Upon receiving the direct access information acquisition request R16 from the direct access management server 400 through the regular access session, the direct access information providing unit 811 generates an URI for direct access including a global IP address and a port number mapped into a local IP address and a port number of the controller 800a in the router, and transmits the direct access information acquisition response R17 including the URI for direct access to the direct access management server 400 through the regular access session (S24 in FIG. 17).

In FIG. 6, upon receiving the direct access information acquisition response R17 from the controller 800a through the regular access session, the direct access request processing unit 403 in the direct access management server 400 transmits the URI for direct access included in the direct access information acquisition response R17, as the direct access start response R10, to the service server 300a which is a direct access start request source (S25 in FIG. 17).

In FIG. 15, upon receiving the direct access start response R10 from the direct access management server 400, the remote recording reservation processing unit 322 in the service server 300a accesses the controller 800a based on the URI for direct access included in the direct access start response R10, and transmits the resource status acquisition request R6 including the recording reservation program information D3 and the recording mode information to the controller 800a (S26 in FIG. 17).

In FIG. 16, upon receiving the resource status acquisition request R6 from the service server 300a, the remote recording reservation processing unit 813a in the controller 800a outputs the resource status acquisition request transmission instruction R61 including the recording reservation program information D3 and the recording mode information, which are extracted from the remote recording reservation request R6, to the resource status acquiring unit 812. Upon receiving the resource status acquisition request transmission instruction R61, the resource status acquiring unit 812 transmits the resource status acquisition request R18 including the recording reservation program information D3 and the recording mode information to the recording device 200 (200-1 and 200-2) connected to the controller 800a via the LAN 8 (S27 in FIG. 17).

In FIG. 10, upon receiving the resource status acquisition request R18 from the controller 800a, the resource status providing unit 225 in the recording device 200 (200-1 and 200-2) determines whether or not remote recording reservation is present according to resource status, based on the recording reservation program information D3 and the recording mode information included in the resource status acquisition request R18, the recording reservation list stored in the recording reservation information storing unit 222, empty capacity of the contents data storing unit 224, etc., and transmits the resource status acquisition response R19 including a result of the determination as the resource status information D7 to the controller 800a via the LAN 8 (S28 in FIG. 17).

In FIG. 16, upon receiving the resource status acquisition response R19 from the recording device 200 (200-1 and 200-2) connected to the resource status acquiring unit 812 via the LAN 8, the resource status acquiring unit 812 in the controller 800a extracts the resource status information D7 from the resource status acquisition response R19, prepares the resource status list D10 of the recording device 200 (200-1 and 200-2) (S29 in FIG. 17), and sends the resource status list D10 to the resource status analyzing unit 815 in the controller 800a. The resource status list D10 includes control-targeted device IDs for service server, control-targeted device names and resource status information for each recording device 200.

The resource status analyzing unit 815 in the controller 800a analyzes the resource status list D10 of the recording device 200 (200-1 and 200-2) to determine the recording device 200 most appropriate for the remote recording reservation site (S30 in FIG. 17), searches a local IP address corresponding to the control-targeted device ID of the recording device 200 from the device/local IP address table 814, and sends the remote recording reservation instruction R8a including the local IP address of the recording device 200, the recording reservation program information D3 and the recording mode information to the remote recording reservation processing unit 813a to make remote recording reservation for the recording device 200.

Upon receiving the remote recording reservation instruction R8a from the resource status analyzing unit 815, the remote recording reservation processing unit 813a in the controller 800a accesses the recording device 200 (the recording device 200-2 in this example) via the LAN 8 based on the local IP address included in the remote recording reservation instruction R8a, and sends the remote recording reservation instruction R21 including the recording reservation program information D3 and the recording mode information, which are extracted from the remote recording reservation instruction R8a, to the recording device 200 via the LAN 8 (S31 in FIG. 17).

In FIG. 10, upon receiving the remote recording reservation instruction R21 from the controller 800a, the remote recording reservation processing unit 221 in the recording device 200-2 registers the recording reservation program information D3 and the recording mode information, which are included in the remote recording reservation instruction R21, in a recording reservation list stored in the recording reservation information storing unit 222, and then transmits the remote recording reservation result notification R22 indicating completion of the remote recording reservation to the controller 800a via the LAN 8 (S32 in FIG. 17).

In FIG. 16, upon receiving the remote recording reservation result notification R22 from the recording device 200-2 via the LAN 8, the remote recording reservation processing unit 813a in the controller 800a transmits the remote recording reservation result notification R12 to the service server 300a via the network 1 (S33 in FIG. 17).

In FIG. 15, upon receiving the remote recording reservation result notification R12 from the service server 300a, the remote recording reservation processing unit 322 in the service server 300a transmits the remote recording reservation result notification R3 to the terminal unit 100a, which is a remote recording reservation request source, via the network 1 (S34 in FIG. 17).

As described above, according to this embodiment, the controller 800a can collect the information on remote recording reservation according resource status of the recording device 200 to be controlled by the terminal unit 100a via the LAN 8, select the recording device 200 most appropriate for the remote recording reservation site based on the resource status information list of the recording device 200, and transmit the remote recording reservation instruction R21 to the recording device 200 via the LAN 8. That is, from the stand point of resource status of the recording device 200, it is possible to make remote recording reservation for the recording device 200 most appropriate for the remote recording reservation site over the network.

Next, a modification of the above embodiments will be described.

Although it has been illustrated in the network system 10 of the first embodiment that the service server 300 accesses the controller 800 based on the URI for direct access of the controller 800, which is acquired from the direct access management server 400, and transmits the resource status acquisition request R6 to the controller 800, the terminal unit 100 may acquire the URI for direct access of the controller 800 from the service server 300 and transmit the resource status acquisition request R6 to the controller 800.

In addition, although the service server 300 and the direct access management server 400 have been realized in their respective servers in the first embodiment, the service server 300 and the direct access management server 400 may be integrated into one server by combining the software configuration of the service server 300 and the software configuration of the direct access management server 400.

It should be understood by those skilled in the art that various modifications, combinations, sub-combinations and alterations may be occur depending on design requirements and other factors insofar as they are within the scope of the appended claims or the equivalents thereof.

What is claimed is:

1. A network system comprising:
a terminal unit;
one or more recording devices;
a service server that provides the terminal unit with a service to make remote recording reservation for the recording device via a network; and
a controller that receives a remote recording reservation request from the service server via the network and selectively makes remote recording reservation for the one or more recording devices via a local area network, wherein
the terminal unit includes a remote recording reservation requesting unit that transmits the remote recording reservation request for the one or more recording devices to the service server, the terminal unit is configured to receive from a user a selection of a recording device most appropriate as a remote recording reservation site, the service server includes a remote recording reservation processing unit that transmits a resource status acquisition request to request acquisition of information on resource status of the one or more recording devices to the controller upon receiving the remote recording reservation request from the terminal unit, the controller includes a resource status acquiring unit that transmits a resource status acquisition instruction to the one or more recording devices via the local area network according to the resource status acquisition request from the service server and receives the information on resource status from the one or more recording devices, and each of the one or more recording devices includes a resource status providing unit that makes a determination on remote recording reservation depending on resource status of the recording device according to the resource status acquisition instruction from the controller and transmits a result of the determination, as the resource status information, to the controller via the local area network.

2. The system according to claim 1, wherein the terminal unit displays a list of each of available resource and a status for each available resource, and the terminal unit receives the selection of one of the available resources from the list.

3. A controller configured to connect to one or more recording devices via a local area network, to be accessible to a network along with a terminal unit and a service server which provides the terminal unit with a service to make a remote recording reservation for the one or more recording devices via the network, to receive a remote recording reservation request from the service server, and to selectively make the remote recording reservation for the one or more recording devices via the local area network, the controller comprising:

a first processor configured to operate as a resource status acquiring unit that, upon receiving a resource status acquisition request to request acquisition of resource status information of the one or more recording devices, the resource status acquisition request being transmitted from the service server that received the remote recording reservation request from the terminal unit, is configured to transmit a resource status acquisition instruction to the one or more recording devices via the local area network and to receive a result of a determination on the remote recording reservation depending on a resource status of the one or more recording devices, as the resource status information, from the one or more recording devices, wherein the terminal unit is configured to receive from a user a selection of a recording device most appropriate as a remote recording reservation site.

4. The controller according to claim 3, wherein the resource status acquiring unit is configured to transmit the resource status information, which is received from the one or more recording devices, to the service server.

5. The controller according to claim 3, further comprising a resource status analyzing unit configured to analyze the resource status information of the one or more recording devices, which is acquired by the resource status acquiring unit, to determine the recording device most appropriate as a remote recording reservation site.

6. The controller according to claim 5, further comprising a remote recording reservation processing unit configured to transmit a remote recording reservation instruction to the recording device, which is determined by the resource status analyzing unit, via the local area network.

7. The controller according to claim 3, wherein the terminal unit displays a list of each of available resource and a status for each available resource, and the terminal unit receives the selection of one of the available resources from the list.

8. A recording device comprising:

a second processor configured to operate as a resource status providing unit and configured to connect via a local area network to a controller in which the controller comprises: a first processor configured to operate as a resource status acquiring unit that, upon receiving a resource status acquisition request to request acquisition of resource status information of one or more recording devices, the resource status acquisition request being transmitted from a service server that received a remote recording reservation request from a terminal unit, is configured to transmit a resource status acquisition instruction to the one or more recording devices via the local area network and to receive a result of a determination on the remote recording reservation depending on a resource status of the one or more recording devices, as a resource status information, from the one or more recording devices, wherein the terminal unit is configured to receive from a user a selection of a recording device most appropriate as a remote recording reservation site, and to make the determination on the remote recording reservation depending on the resource status of the one or more recording devices based on the resource status acquisition instruction transmitted from the controller via the local area network, and to transmit the result of the determination, as the resource status information, to the controller via the local area network.

9. The recording device according to claim 8, wherein the resource status acquisition instruction includes information specifying contents, which are an object of the remote recording reservation, and recording mode information, and the resource status providing unit is configured to calculate a capacity required for recording of the contents based on the information specifying the contents and the recording mode information, to make the determination on the remote recording reservation based on a required capacity and an empty capacity of a recording medium for contents recording, and to transmit a result of the determination, as the resource status information, to the controller via the local area network.

10. The recording device according to claim 8, wherein the resource status providing unit is configured to make the determination on an empty situation of a tuner, which is a resource of broadcasting reception, based on the information specifying contents and a recording reservation list in which information on a registered recording reservation is registered, and to transmit a result of the determination, as the resource status information, to the controller via the local area network.

11. The recording device according to claim 8, wherein the resource status providing unit is configured to make the determination on whether contents of the remote recording reservation have been already registered, based on the information specifying contents and a recording reservation list in which information on registered recording reservation is registered, and when the contents of the recording reservation were registered, to transmit the resource status information, which includes a designation that the contents of the recording reservation were registered, to the controller via the local area network.

12. A service server configured to connect to a network along with a terminal unit and a controller, and to provide the terminal unit with the service to make the remote recording reservation for the one or more recording devices via the network, the server comprising:
 a third processor configured to operate as a remote recording reservation processing unit that, upon receiving the remote recording reservation request for the one or more recording devices from the terminal unit, is configured to transmit the resource status acquisition request to request acquisition of the resource status information of the one or more recording devices to the controller, and to receive the result of the determination on the remote recording reservation depending on the resource status of the one or more recording devices, as the resource status information, in the one or more recording devices from the controller; wherein the controller comprises:
 a first processor configured to operate as a resource status acquiring unit that, upon receiving a resource status acquisition request to request acquisition of resource status information of the one or more recording devices, the resource status acquisition request being transmitted from the service server that received the remote recording reservation request from the terminal unit, is configured to transmit a resource status acquisition instruction to the one or more recording devices via the local area network and to receive a result of a determination on the remote recording reservation depending on a resource status of the one or more recording devices, as the resource status information, from the one or more recording devices, wherein the terminal unit is configured to receive from a user a selection determination of a recording device most appropriate as a remote recording reservation site.

13. The service server according to claim 12, wherein
 the remote recording reservation request transmitted from the terminal unit includes operation mode information, and
 the remote recording reservation processing unit makes a determination on whether the resource status information of the one or more recording devices, which is received from the controller, is transmitted to the terminal unit, based on the operation mode information.

14. The service server according to claim 13, further comprising a resource status analyzing unit configured to analyze the resource status information to determine the recording device most appropriate as a remote recording reservation site when the remote recording reservation processing unit determines that the resource status information of the one or more recording devices is not transmitted to the terminal unit of a remote recording reservation source.

15. A method of acquiring a resource status of one or more recording devices in a network system including a terminal unit, one or more recording devices, a service server that provides the terminal unit with a service to make a remote recording reservation for the one or more recording devices via a network, and a controller that receives a remote recording reservation request from the service server via the network and selectively makes the remote recording reservation for the one or more recording devices via a local area network, the method comprising:
 by a remote recording reservation requesting unit in the terminal unit, transmitting the remote recording reservation request for the one or more recording devices to the service server;
 by the terminal unit, receiving from a user a selection of a recording device most appropriate as a remote recording reservation site;
 by a remote recording reservation processing unit in the service server, transmitting a resource status acquisition request to request acquisition of resource status information of the one or more recording devices to the controller upon receiving the remote recording reservation request from the terminal unit;
 by a resource status acquiring unit in the controller, transmitting a resource status acquisition instruction to the one or more recording devices via the local area network according to the resource status acquisition request from the service server;
 by a resource status providing unit in the recording device, making a determination on the remote recording reservation depending on the resource status of the one or more recording devices according to the resource status acquisition instruction from the controller and transmitting a result of the determination, as the resource status information, to the controller via the local area network; and
 by the resource status acquiring unit in the controller, receiving the resource status information from the one or more recording devices.

16. The non-transitory computer readable medium according to claim 15, wherein the terminal unit displays a list of each of available resource and a status for each available resource, and the terminal unit receives the selection of one of the available resources from the list.

17. A non-transitory computer readable medium encoded thereon with a computer program for a controller configured to connect to one or more recording devices via a local area network, to be accessible to a network along with a terminal unit and a service server which provides the terminal unit with a service to make a remote recording reservation for the one or more recording devices via the network, to receive a remote recording reservation request from the service server, and to selectively make the remote recording reservation for the one or more recording devices via the local area network, the computer program causing a computer to perform a method of a resource status acquiring unit comprising:
 upon receiving a resource status acquisition request to request acquisition of resource status information of the one or more recording devices, the resource status acquisition request being transmitted from the service server that received the remote recording reservation request from the terminal unit,
 transmitting a resource status acquisition instruction to the one or more recording devices via the local area network, and
 receiving a result of a determination on the remote recording reservation depending on a resource status of the one or more recording devices, as the resource status information, from the one or more recording devices, wherein
 the terminal unit is configured to receive from a user a selection of a recording device most appropriate as a remote recording reservation site.

18. The non-transitory computer readable medium according to claim 17, wherein the terminal unit displays a list of each of available resource and a status for each available resource, and the terminal unit receives the selection of one of the available resources from the list.

19. A non-transitory computer readable medium encoded thereon with a computer program for a service server that is configured to connect to a network along with a terminal unit and a controller, and to provide the terminal unit with the service to make the remote recording reservation for the one or more recording devices via the network, the computer program causing a computer to perform a method of a remote recording reservation processing unit comprising:

upon receiving the remote recording reservation request for the one or more recording devices from the terminal unit, transmitting the resource status acquisition request to request acquisition of the resource status information of the one or more recording devices to the controller, and receiving a result of the determination on the remote recording reservation depending on the resource status, as the resource status information, in the one or more recording devices from the controller; wherein the controller comprises:

a first processor configured to operate as a resource status acquiring unit that, upon receiving a resource status acquisition request to request acquisition of resource status information of the one or more recording devices, the resource status acquisition request being transmitted from the service server that received the remote recording reservation request from the terminal unit, is configured to transmit a resource status acquisition instruction to the one or more recording devices via the local area network and to receive a result of a determination on the remote recording reservation depending on a resource status of the one or more recording devices, as the resource status information, from the one or more recording devices, wherein the terminal unit is configured to receive from a user a selection determination of a recording device most appropriate as a remote recording reservation site.

\* \* \* \* \*